US012797977B2

(12) United States Patent
Yamashita et al.

(10) Patent No.: US 12,797,977 B2
(45) Date of Patent: Nov. 17, 2026

(54) CUTTING APPARATUS AND MULTI-LAYERED MATERIAL

(71) Applicant: NIPPON STEEL CORPORATION, Tokyo (JP)

(72) Inventors: Satoru Yamashita, Tokyo (JP); Shinnosuke Nishijima, Tokyo (JP); Naoki Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 119 days.

(21) Appl. No.: 18/696,897

(22) PCT Filed: Aug. 22, 2022

(86) PCT No.: PCT/JP2022/031527
§ 371 (c)(1),
(2) Date: Mar. 28, 2024

(87) PCT Pub. No.: WO2023/058341
PCT Pub. Date: Apr. 13, 2023

(65) Prior Publication Data

US 2024/0390998 A1 Nov. 28, 2024

(30) Foreign Application Priority Data

Oct. 5, 2021 (JP) ................................ 2021-164173

(51) Int. Cl.
*B23D 19/06* (2006.01)
*B21D 28/16* (2006.01)
*B32B 15/18* (2006.01)

(52) U.S. Cl.
CPC ............ *B23D 19/06* (2013.01); *B21D 28/16* (2013.01); *B32B 15/18* (2013.01)

(58) Field of Classification Search
CPC ........ B21D 28/16; B21D 28/02; B32B 15/18; B32B 15/013; B23D 19/06; B23D 35/001
(Continued)

(56) References Cited

U.S. PATENT DOCUMENTS 8,623,178 B2 * 1/2014 Ohyabu ............... B26D 1/0006 242/525.7
2006/0005672 A1 * 1/2006 Chapman ............. B26D 1/0006 83/13
(Continued)

FOREIGN PATENT DOCUMENTS

DE 102005037975 A1 * 2/2007 ............. B24B 3/363
JP 58-186514 A 10/1983
(Continued)

OTHER PUBLICATIONS

Translation JP-2020040192-A (Year: 2025).*
Translation (Year: 2026).*

*Primary Examiner* — Nhat Chieu Q Do
(74) *Attorney, Agent, or Firm* — Birch, Stewart, Kolasch & Birch, LLP

(57) ABSTRACT

There is provided a cutting apparatus for cutting a multi-layered material sandwiched between a first tool and a second tool, including the first tool and the second tool are disposed such that blade portions of the first tool and the second tool face each other in a pressing direction, at least any one of the blade portions of the first tool and the second tool includes: an inclined portion including a tool inclined surface that is inclined with respect to the pressing direction; and a protruding portion including a vertical wall surface and a pressing surface and protruding from the inclined portion in the pressing direction, the vertical wall surface extending from the tool inclined surface along the pressing direction, the pressing surface being perpendicular to the vertical wall surface, and the inclined portion overlaps a tool
(Continued)

facing the inclined portion as viewed in the pressing direction.

8 Claims, 20 Drawing Sheets

(58) Field of Classification Search
USPC .......................................................... 83/492
See application file for complete search history.

(56) References Cited

U.S. PATENT DOCUMENTS

| | | | | |
|---|---|---|---|---|
| 2019/0364868 | A1* | 12/2019 | Garner | B26B 17/00 |
| 2022/0168916 | A1* | 6/2022 | Nakamura | B26D 1/245 |

FOREIGN PATENT DOCUMENTS

| | | | | |
|---|---|---|---|---|
| JP | S58186514 | A | * | 10/1983 |
| JP | 62-50013 | U | | 3/1987 |
| JP | 2001-79719 | A | | 3/2001 |
| JP | 2004-34183 | A | | 2/2004 |
| JP | 2018-75600 | A | | 5/2018 |
| JP | 2020040192 | A | * | 3/2020 |
| JP | 2020-116724 | A | | 8/2020 |

* cited by examiner

| θ | 15° | 30° | 45° |
|---|---|---|---|
| PROTRUSION HEIGHT | 0.1mm | | |
| PICTURE OF SECTION |  |  |  |
| REMAINING PLATING REGION HEIGHT (Hp) | 1.07 | 2.23 | 2.85 |

| | COMPARATIVE EXAMPLE | INVENTIVE EXAMPLE |
|---|---|---|
| CONDITION | CLEARANCE : 0.35mm | $\theta$ : 45° H : 0.1mm |
| PICTURE OF SECTION |   |   0.5mm |

| | COMPARATIVE EXAMPLE | INVENTIVE EXAMPLE 1 | INVENTIVE EXAMPLE 2 |
|---|---|---|---|
| CONDITION | — | $\theta$ : 30° H : 0.4mm | $\theta$ : 45° H : 0.1mm |
| RATIO OF REMAINING PLATING | 17.8% | 74.1% | 69.5% |
| BEFORE EXPOSURE |  |  |  |
| TWO WEEKS LATER |  RED RUST FORMED |  |  |
| FOUR WEEKS LATER |  |  RED RUST SLIGHTLY FORMED |  RED RUST SLIGHTLY FORMED 1.0mm |

CUTTING APPARATUS AND MULTI-LAYERED MATERIAL

TECHNICAL FIELD

The present invention relates to a cutting apparatus for cutting a multi-layered material and to a multi-layered material including a cut end surface.

BACKGROUND ART

A multi-layered material formed by coating surfaces of a base material with a coating material, such as a plated steel sheet in which surfaces of a steel sheet are subjected to plating treatment or a coated steel sheet in which surfaces of a steel sheet are coated, is produced and used in accordance with its application. For example, in a case of a plated steel sheet used as a construction material, an automobile, or a home appliance, the reason for coating the base material with the coating material is to have a better corrosion resistance with the coating material (plating) than a state of the base material (the steel sheet) as it is. However, a process of producing a component or the like from a multi-layered material as a starting material includes a step of cutting a needed member from an original sheet, such as shearing or laser cutting. A cut end surface formed by the cutting step includes a shear surface and a rupture surface on which a base material is almost exposed. On a portion of the cut end surface on which the base material is exposed, an effect provided by a coating material is not exerted. For example, in a case where the multi-layered material is a plated steel sheet, an advantageous effect of improving corrosion resistance by the plating cannot be provided on the portion of the cut end surface on which the base material is exposed, and there is a concern about occurrence of red rust.

For this reason, even in a case of a component made of a multi-layered material as a starting material, to develop an effect provided by a coating material on a cut end surface as with front and back surfaces coated with the coating material, it is generally necessary to subject the cut end surface after machining to after-machining repair (in a case of plating, application of paint containing a principal component of the plating, etc.). This is laborious and costly. Thus, a technique has been studied, which makes, in cutting a multi-layered material, a large amount of a coating material is dragged into a cut end surface, so as to exert an effect provided by the coating material on the cut end surface as with front and back surfaces.

For example, Patent Document 1 discloses a method for cutting a steel sheet including: causing a steel sheet including a coating material to run between two vertically opposing, groove-forming round edges that have an angle θ of 20° to 70° and R of 0.03 to 0.30 mm in ends thereof; forming, on a front surface and a back surface of a steel strip, press-formed grooves whose depths on both surfaces are 80% or more of a sheet thickness of the steel sheet in total; and then causing the steel sheet to run between other round edges along the grooves to cut the steel sheet, so that plating is made to be dragged into its end surface.

In addition, as a cutting tool for which consideration is given to a shape of a cut end surface of a sheet material, for example, Patent Document 2 discloses shearing die and punch that include a die having a first shearing blade and a punch having a second shearing blade. The punch having the second shearing blade includes a third shearing blade rearward of the second shearing blade. A clearance between the third shearing blade and the first shearing blade is smaller than a clearance between the second shearing blade and the first shearing blade. In shearing a workpiece using such shearing die and punch, a cut surface with a shear droop that is formed when the workpiece is sheared with the first shearing blade and the second shearing blade is scraped off with the first shearing blade and the third shearing blade whose blade surface is an inclined surface, so that the shear droop is removed without formation of a burr, thus providing a good cut surface.

LIST OF PRIOR ART DOCUMENTS

Patent Document

Patent Document 1: JP 2004-34183 A
Patent Document 2: JP 62-50013 U1

SUMMARY OF INVENTION

Technical Problem

However, the method for cutting a steel sheet described in Patent Document 1 requires two steps including a first step of forming the grooves on the plated steel sheet while making the plating on its surfaces is dragged into an end surface and a second step of cutting the plated steel sheet. Therefore, the method is laborious. In addition, the second step forms a shear surface and a rupture surface that are not coated with the plating. Therefore, corrosion resistance of the cut end surface decreases. Furthermore, the cutting of the plated steel sheet in the second step can cause a protrusion such as a burr to remain at a sheet-thickness center.

In contrast, using shearing die and punch described in Patent Document 2 to shear a workpiece makes it possible to prevent a shear droop or a burr from being formed on a cut surface of the workpiece. However, in Patent Document 2, no consideration is given to cutting a multi-layered material such as a plated steel sheet. That is, in Patent Document 2, no consideration is given to coating a cut surface of a workpiece with a coating material, and in shearing a workpiece with the shearing die and punch described in Patent Document 2, it is difficult to exert an effect provided by the coating material such as corrosion resistance on the cut surface of the workpiece after being sheared. In addition, in shearing a workpiece with the shearing die and punch described in Patent Document 2, shearing the workpiece with the third shearing blade causes formation of a scrap, which raises a problem in that the shearing can be applied only to an application in which the formation of a scrap is tolerable and a problem of decreasing a yield rate of the workpiece.

The present invention is thus made in view of the problems described above, and an objective of the present invention is to provide a cutting apparatus and a multi-layered material that can exert the effect provided by a coating material on a cut end surface as much as on front and back surfaces and can satisfy specifications required of the multi-layered material after being cut.

Solution to Problem

According to an aspect of the present invention in order to achieve the above-mentioned object, there is provided a cutting apparatus for cutting a multi-layered material sandwiched between a first tool and a second tool, including the first tool and the second tool are disposed such that blade portions of the first tool and the second tool face each other in a pressing direction, at least any one of the blade portions of the first tool and the second tool includes: an inclined portion including a tool inclined surface that is inclined with respect to the pressing direction; and a protruding portion including a vertical wall surface and a pressing surface and protruding from the inclined portion in the pressing direction, the vertical wall surface extending from the tool inclined surface along the pressing direction, the pressing surface being perpendicular to the vertical wall surface, and the inclined portion overlaps a tool facing the inclined portion as viewed in the pressing direction.

An inclination angle of the tool inclined surface with respect to the pressing direction may be 15° or more to 45° or less.

Moreover, a length of the vertical wall surface in the pressing direction may be 0.1 mm or more to 0.8 mm or less.

The first tool and the second tool each may include the inclined portion and the protruding portion.

A curvature radius of a corner portion at which the vertical wall surface and the pressing surface intersect with each other may be 0.1 mm or less.

A shape of the first tool and a shape of the second tool may be symmetrical to each other.

According to another aspect of the present invention, to solve the problems, there is provided a multi-layered material formed by coating a surface of a base material with a coating material, the multi-layered material including a cut end surface that extends along a sheet thickness direction from a first surface toward a second surface, wherein the cut end surface includes an inclined surface and a rupture surface in this order, the inclined surface being inclined with respect to the sheet thickness direction, and at least part of the inclined surface is coated with the coating material that is continued from the first surface.

A length of the rupture surface in the sheet thickness direction may be 30% or less of a sheet thickness of the multi-layered material.

The first surface may intersect with the inclined surface, the second surface may intersect with the rupture surface, and an internal angle between the first surface and the inclined surface may an obtuse angle.

The coating material may be made of Zn, Al, or an alloy of Zn and Al.

The base material may be a steel sheet.

Advantageous Effects of Invention

As described above, according to the present invention, it becomes possible to exert the effect provided by the coating material on the cut end surface as much as on the front and back surfaces and to satisfy specifications required of the multi-layered material after being cut, such as prevention of formation of a burr.

DESCRIPTION OF EMBODIMENTS

Figure 1:
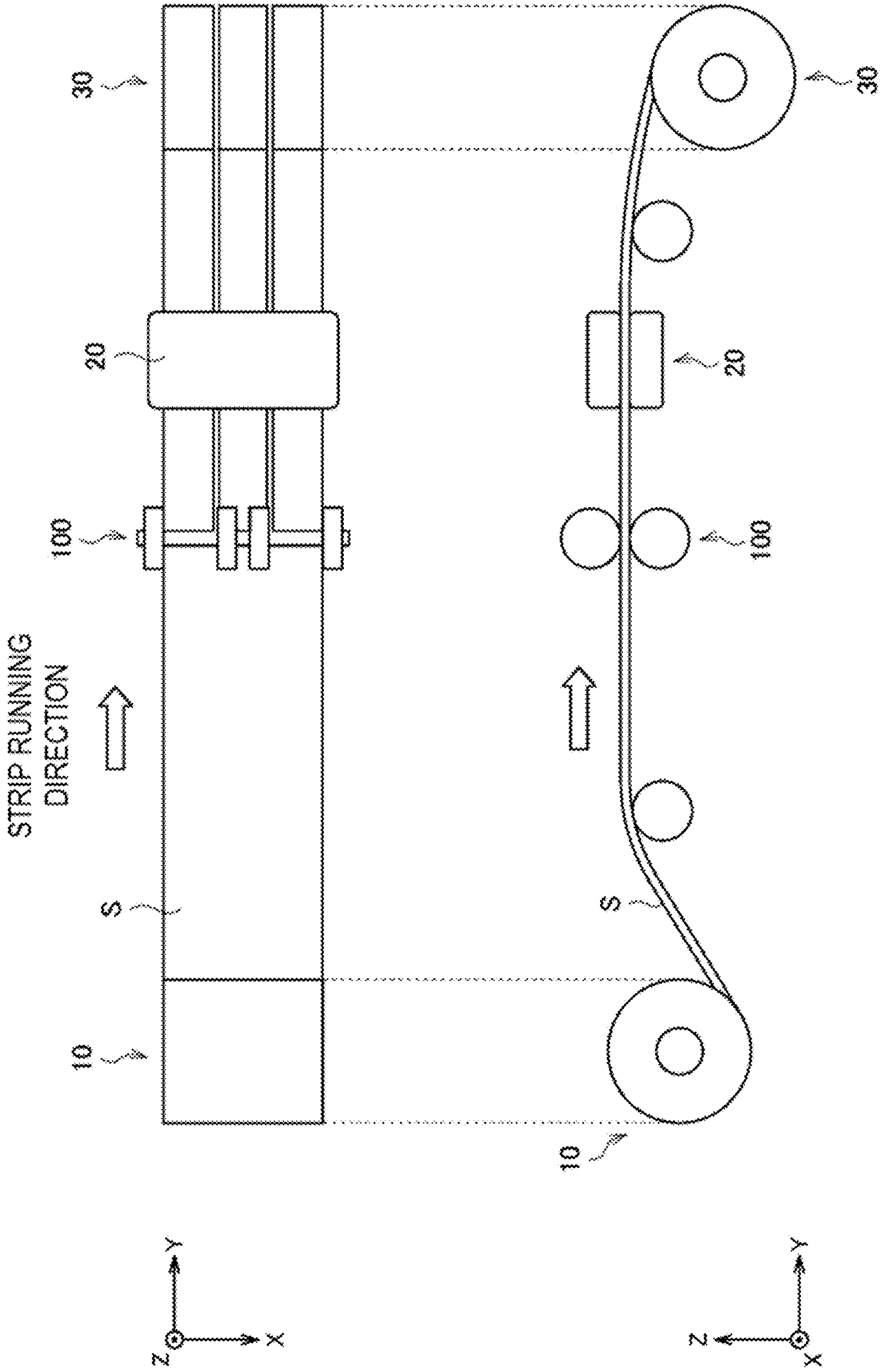
FIG. 1 is a schematic diagram illustrating a configuration example of a slitting facility that includes a slitting apparatus, which is an example of a cutting apparatus according to an embodiment of the present invention, where its upper side illustrates a plan view, and its lower side illustrates a side view.

A preferred embodiment of the present invention will be described below in detail with reference to the accompanying drawings. In the present specification and drawings, components having substantially the same functions and structures are denoted by the same reference characters, and the repeated description thereof will be omitted.

[1. Cutting Apparatus]

Figure 2:
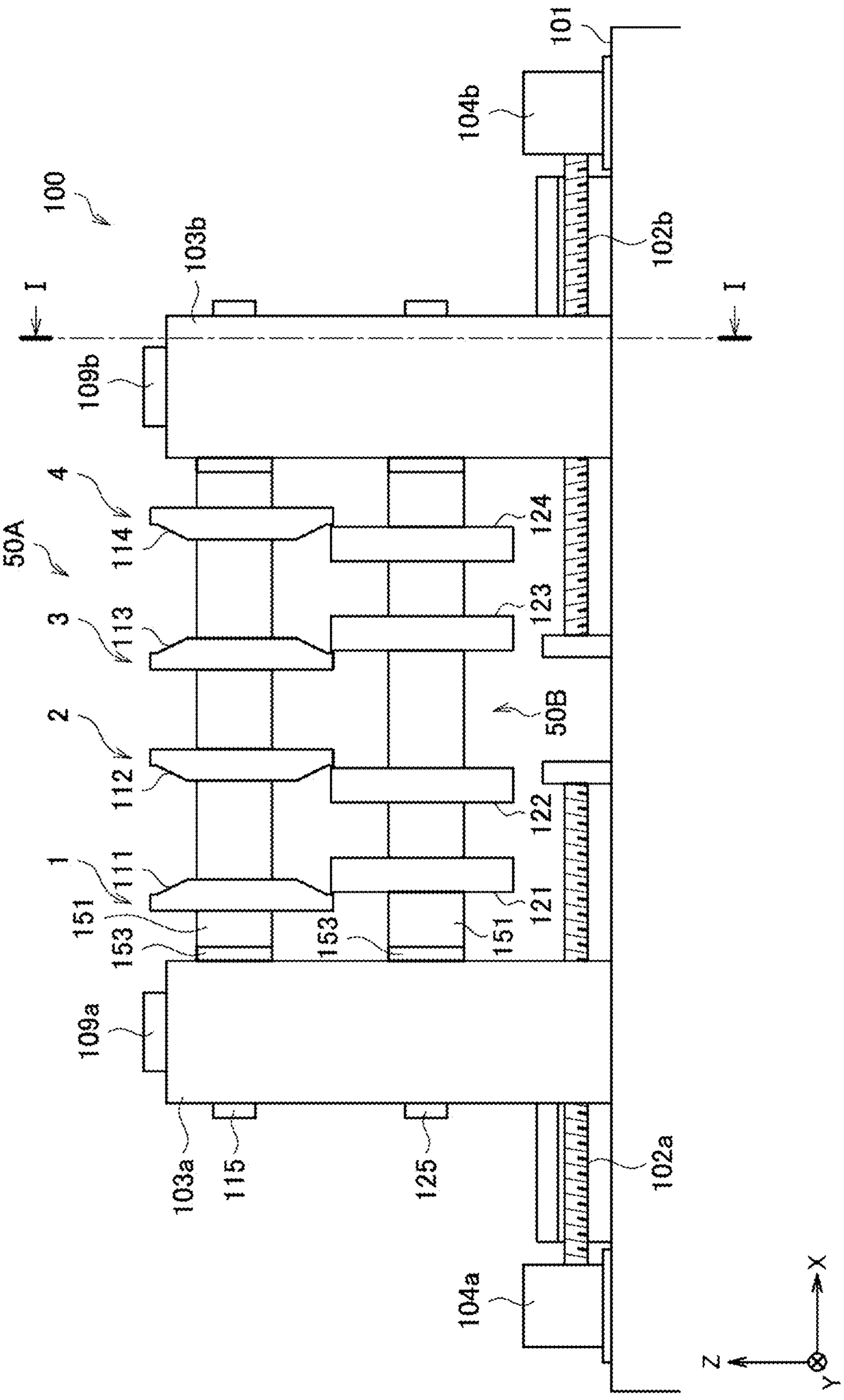
FIG. 2 is a schematic diagram illustrating a configuration example of the slitting apparatus according to the embodiment.
Figure 3:
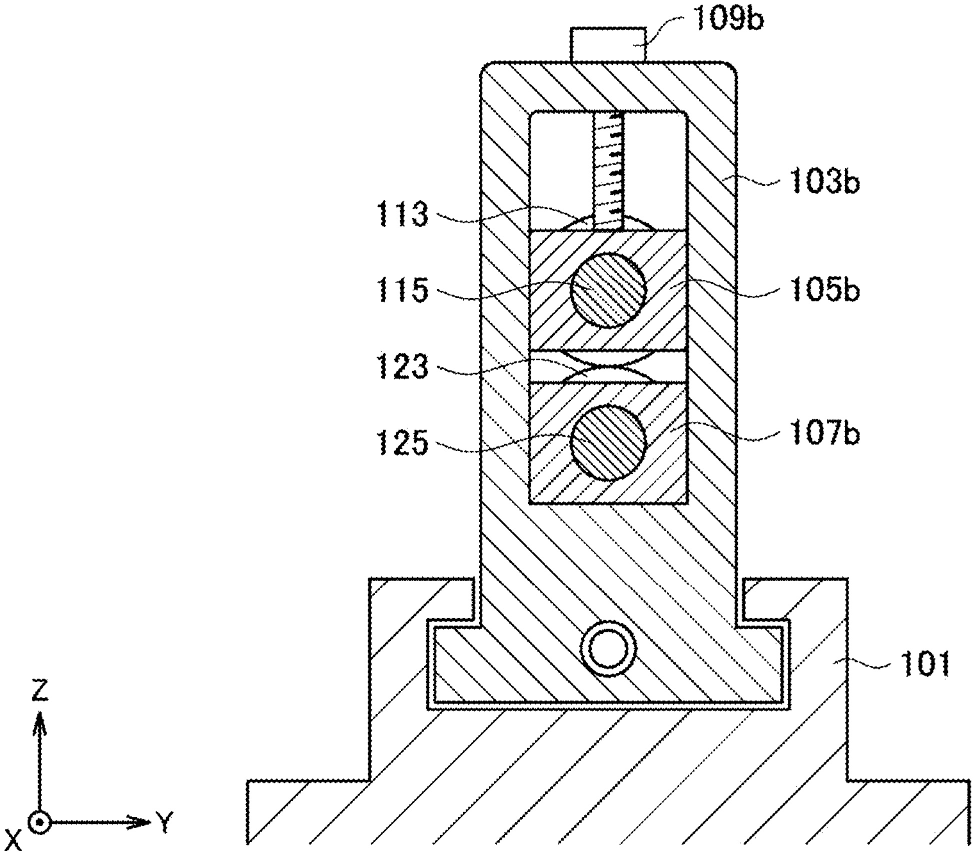
FIG. 3 is a sectional view of the slitting apparatus illustrated in FIG. 2 taken along the cutting line I-I.
Figure 4:
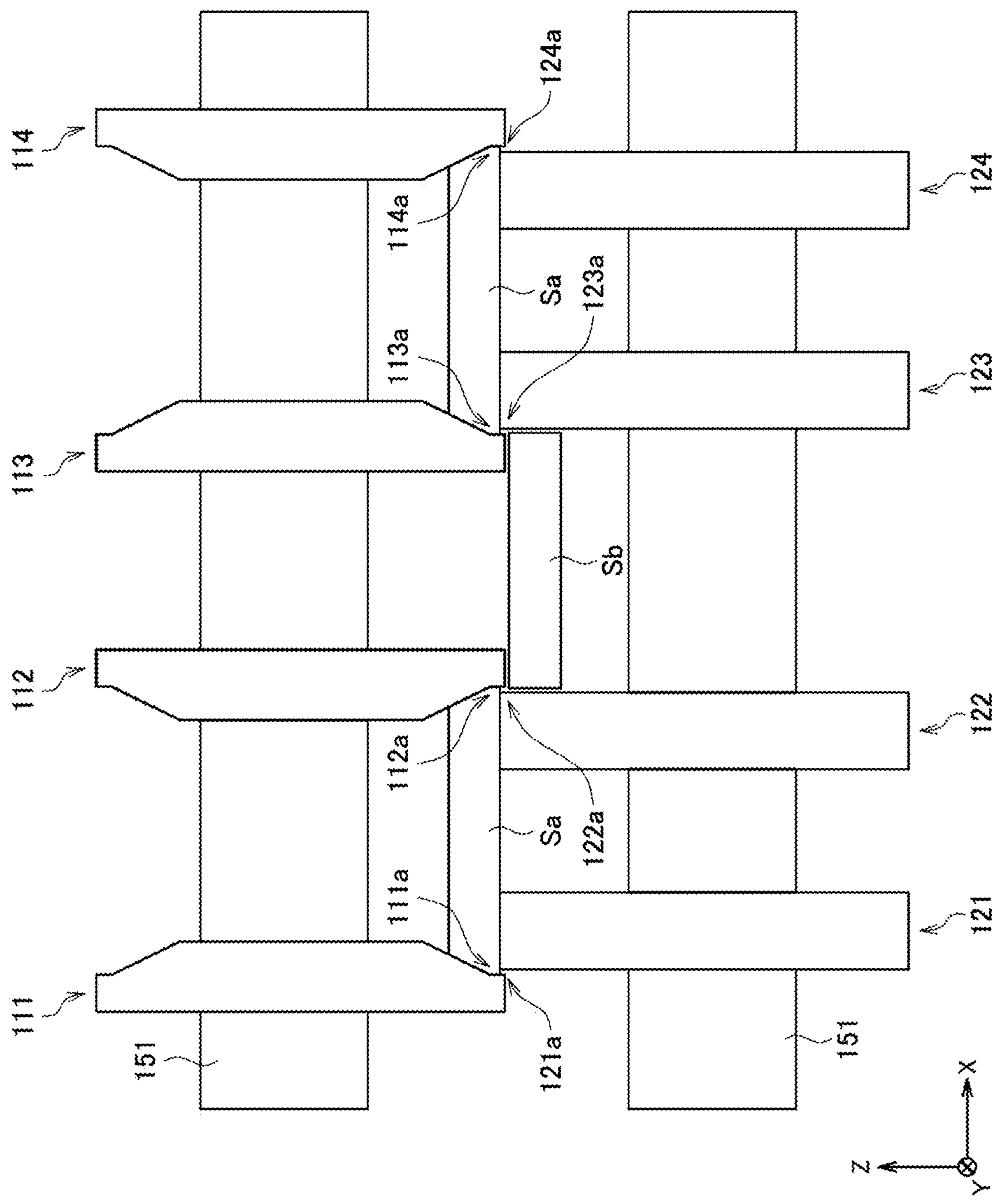
FIG. 4 is a partially enlarged view of an upper rotary part and a lower rotary part of the slitting apparatus according to the embodiment, illustrating a case where a pair of slitting blade portions have different shapes.
Figure 5:
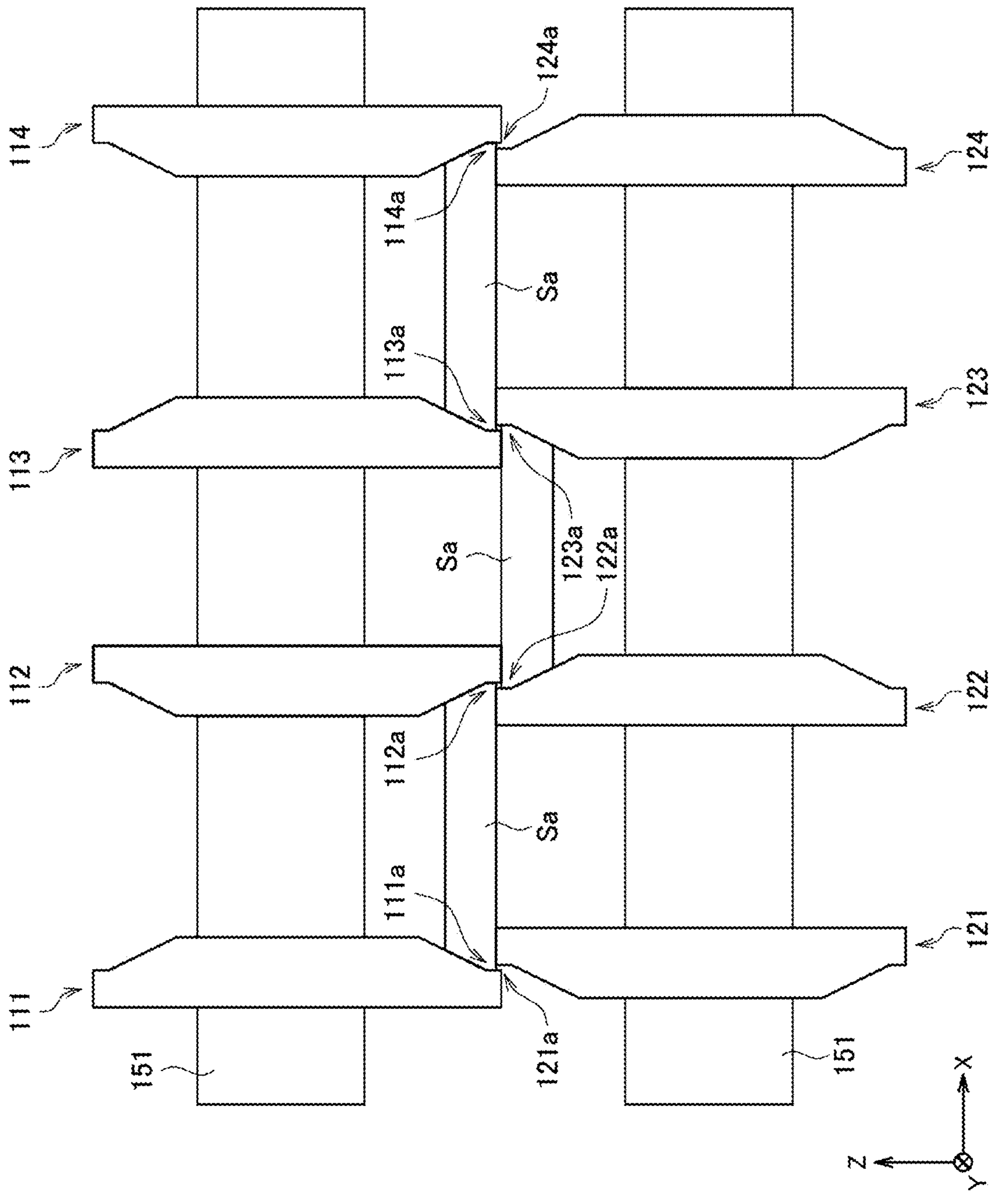
FIG. 5 is a partially enlarged view of an upper rotary part and a lower rotary part of the slitting apparatus according to the embodiment, illustrating a case where a pair of slitting blade portions have shapes that are vertically symmetrical to each other.

First, based on FIG. 1 to FIG. 5, a schematic configuration of a cutting apparatus according to an embodiment of the present invention will be described. FIG. 1 is a schematic diagram illustrating a configuration example of a slitting facility that includes a slitting apparatus 100, which is an example of a cutting apparatus according to the present embodiment, where its upper side is a plan view, and its lower side is a side view. FIG. 2 is a schematic diagram illustrating a configuration example of the slitting apparatus 100 according to the present embodiment. FIG. 3 is a sectional view of the slitting apparatus 100 illustrated in FIG. 2 taken along the cutting line I-I. FIG. 4 is a partially enlarged view of an upper rotary part 50A and a lower rotary part 50B of the slitting apparatus 100 according to the present embodiment, illustrating a case where a pair of slitting blade portions have different shapes. FIG. 5 is a partially enlarged view of an upper rotary part 50A and a lower rotary part 50B of the slitting apparatus 100, illustrating a case where a pair of slitting blade portions have shapes that are vertically symmetrical to each other.

Note that FIG. 4 and FIG. 5 each illustrate only halves of the upper rotary part 50A and the lower rotary part 50B from rotation centers of the upper rotary part 50A and the lower rotary part 50B. In the following description, as an example of a multi-layered material being a cutting object by the slitting apparatus 100, a plated steel sheet S in which surfaces of a steel sheet being a base material are coated with plating that is a coating material will be mentioned. In FIG. 1 to FIG. 5, for the description, a sheet length direction of the plated steel sheet S is taken as an X direction, a sheet width direction of the plated steel sheet S is taken as a Y direction, and a sheet thickness direction is taken as a Z direction. The Y direction is also a strip running direction of the plated steel sheet S. The Z direction is also a pressing direction of a tool (slitting blade).

The slitting facility is a facility that cuts the plated steel sheet S being a cutting object with the slitting apparatus 100 that includes a pair of rotary blade portions. As illustrated in FIG. 1, the slitting facility includes, for example, a pay-off reel 10, a tension generating device 20, a tension reel 30, and the slitting apparatus 100. The plated steel sheet S wound in a coil shape is unreeled from the pay-off reel 10. Between the pay-off reel 10 and the tension generating device 20, the plated steel sheet S is cut under tension by shear force with the slitting apparatus 100. The slitting apparatus 100 illustrated in FIG. 1 divides the plated steel sheet S into three pieces in a width direction. The plated steel sheet S cut by the slitting apparatus 100 is wound in a coil shape by the tension reel 30.

As illustrated in FIG. 2, the slitting apparatus 100 includes, for example, four pairs of slitting blades 1, 2, 3, and 4. Note that it suffices that the slitting apparatus 100 includes at least one pair of slitting blades. The pairs of slitting blades 1, 2, 3, and 4 respectively include first slitting blades 111, 112, 113, and 114 that are first tools and second slitting blades 121, 122, 123, and 124 that are second tools. As illustrated in FIG. 4, the first slitting blades 111, 112, 113, and 114 and the second slitting blades 121, 122, 123, and 124 that form the pairs are disposed in such a manner as to face each other in the pressing direction (the Z direction). In addition, in the pairs of slitting blades 1, 2, 3, and 4, blade portions 111*a*, 112 *a*, 113*a*, 114*a*, 121*a*, 122*a*, 123*a*, and 124*a* that are provided at outer edge portions of the slitting blades overlap each other as viewed from a rotation-axis direction of each slitting blade (the X direction).

The first slitting blades 111, 112, 113, and 114 and the second slitting blades 121, 122, 123, and 124 illustrated in FIG. 2 and FIG. 4 are different in shape from each other, respectively. In front view, the blade portions 111*a*, 112*a*, 113*a*, and 114*a* of the first slitting blades 111, 112, 113, and 114 each include an inclined portion having a tool inclined surface that is inclined with respect to the pressing direction (the Z direction) and a protruding portion that protrudes from the inclined portion in the pressing direction. In contrast, the blade portions 121*a*, 122*a*, 123*a*, and 124*a* of the second slitting blades 121, 122, 123, and 124 are each a right-angled blade having a corner portion with a substantially right angle. Note that, as illustrated in FIG. 2 and FIG. 4, it suffices that, in the slitting apparatus 100, at least any one of the first slitting blades 111, 112, 113, and 114 and the second slitting blades 121, 122, 123, and 124 includes the blade portion having the inclined portion and the protruding portion. For example, as illustrated in FIG. 5, the first slitting blades 111, 112, 113, and 114 and the second slitting blades 121, 122, 123, and 124 each may include the blade portion having the inclined portion and the protruding portion. The shapes of the blade portions of the slitting blades will be described later in detail.

The first slitting blades 111, 112, 113, and 114 are supported by a first shaft part 115 at their rotation centers. The second slitting blades 121, 122, 123, and 124 are supported by a second shaft part 125 at their rotation centers. As illustrated in FIG. 3, the first shaft part 115 and the second shaft part 125 are rotatably supported by a pair of support parts 103*a* and 103*b* at both ends of the first shaft part 115 and the second shaft part 125 via chocks 105*a* and 105*b* and chocks 107*a* and 107*b*, respectively (chocks 105*a* and 107*a*, which are behind the paper, are not illustrated). The pair of support parts 103*a* and 103*b* are provided on a base 101 illustrated in FIG. 2.

Between the support parts 103*a* and 103*b*, sleeves 151 and 153 may be provided together with the first slitting blades 111, 112, 113, and 114 and the second slitting blades 121, 122, 123, and 124. The sleeves 151 and 153 are members for adjusting distances between the first slitting blades 111, 112, 113, and 114 and distances between the second slitting blades 121, 122, 123, and 124. In FIG. 2, the sleeves 151 and 153 having different widths are provided. However, only sleeves having the same width may be used to adjust the distances between the first slitting blades 111, 112, 113, and 114 and the distances between the second slitting blades 121, 122, 123, and 124.

Hereinafter, the first slitting blades 111, 112, 113, and 114 and the sleeves 151 and 153 supported by the first shaft part 115 will be also referred to as the upper rotary part 50A. In addition, the second slitting blades 121, 122, 123, and 124 and the sleeves 151 and 153 supported by the second shaft part 125 will be also referred to as the lower rotary part 50B. The upper rotary part 50A rotates integrally with the first shaft part 115. The lower rotary part 50B rotates integrally with the second shaft part 125.

The pair of support parts 103*a* and 103*b* are each movable in the sheet width direction (the X direction) by driving units 104*a* and 104*b*. For example, as illustrated in FIG. 2, the pair of support parts 103*a* and 103*b* are in threaded engagement with thread parts 102*a* and 102*b* that are set parallel to the first shaft part 115 and the second shaft part 125. The thread parts 102*a* and 102*b* have one ends connected to the driving units 104*a* and 104*b*, respectively. By driving the driving units 104*a* and 104*b* to rotate the thread parts 102*a* and 102*b*, the support parts 103*a* and 103*b* are caused to move.

By driving the driving units 104*a* and 104*b* to move the support parts 103*a* and 103*b* in the sheet width direction such that the support parts 103*a* and 103*b* are separated from each other, one ends of the first shaft part 115 and the second shaft part 125 come off from the chocks. Thus, the sleeves 151 and 153, the first slitting blades 111, 112, 113, and 114, and the second slitting blades 121, 122, 123, and 124 can be detached from the first shaft part 115 and the second shaft part 125, and the slitting blades or the sleeves for adjusting the distances between the slitting blades can be changed.

On top of the support parts 103*a* and 103*b*, pressing-down devices 109*a* and 109*b* are provided as distance adjusting units that adjust the distance between the first slitting blades 111, 112, 113, and 114 and the second slitting blades 121, 122, 123, and 124 respectively. By tightening the pressing-down devices 109*a* and 109*b*, the distance between the first slitting blades 111, 112, 113, and 114 and the second slitting blades 121, 122, 123, and 124 can be narrowed.

In the slitting apparatus 100 according to the present embodiment, the distance between the first slitting blades 111, 112, 113, and 114 and the second slitting blades 121, 122, 123, and 124 is adjusted by pressing-down devices 109*a* and 109*b* in accordance with a sheet thickness of the plated steel sheet S. Then, the plated steel sheet S is made to pass between the upper rotary part 50A and the lower rotary part 50B while the upper rotary part 50A and the lower rotary part 50B are rotating, and thus the plated steel sheet S is cut. When the plated steel sheet S passes between the upper rotary part 50A and the lower rotary part 50B, the pairs of slitting blades 1, 2, 3, and 4 are gradually pressed in the pressing direction (the Z direction) and cut the plated steel sheet S with shear force.

At this time, a tensile force produced between the plated steel sheet S, and edges of the first slitting blades 111, 112, 113, and 114 and edges of the second slitting blades 121, 122, 123, and 124 makes plating layers on surfaces of the plated steel sheet S are dragged into cut end surfaces, and the cut end surfaces are coated with the plating layers. That is, the plating layers on the surfaces of the plated steel sheet S are made to follow movements of the blade portions 111*a*, 112*a*, 113*a*, and 114*a* of the first slitting blades 111, 112, 113, and 114 and the blade portions 121*a*, 122*a*, 123*a*, and 124*a* of the second slitting blades 121, 122, 123, and 124 with respect to the plated steel sheet S passing through the upper rotary part 50A and the lower rotary part 50B, and the plating layers are made to be dragged into the cut end surfaces. In this manner, the cut end surfaces of the plated steel sheet S are coated with the plating layers.

A configuration of the slitting apparatus 100 according to the present embodiment and slitting facility including the slitting apparatus 100 is described above. Note that, in the following description, the first slitting blades 111, 112, 113, and 114 will be referred to as "first slitting blades 110," and the second slitting blades 121, 122, 123, and 124 will be referred to as "second slitting blades 120." Likewise, the blade portions 111*a*, 112*a*, 113*a*, and 114*a* of the first slitting blades will be referred to as "blade portions 110*a*," and the blade portions 121*a*, 122*a*, 123*a*, and 124*a* of the second slitting blades will be referred to as "blade portions 120*a*," for the description.

[2. Coating Cut End Surface with Coating Material]

A component made of a multi-layered material is produced by, for example, cutting the multi-layered material with a cutting apparatus and then machined. At this time, a state of a cut end surface of the multi-layered material differs in accordance with a shape of a blade of the cutting apparatus for cutting the multi-layered material. Hereinafter, a state of cut end surfaces of a plated steel sheet 5 being cut, which is an example of the multi-layered material, will be described.

Figure 6:
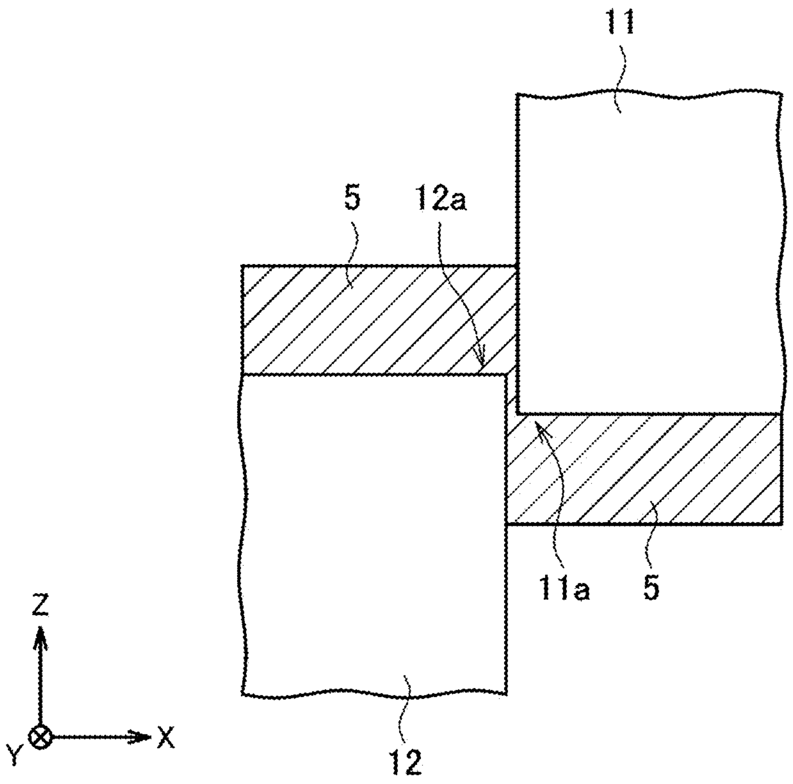
FIG. 6 is a schematic diagram illustrating how cutting is performed when a first slitting blade and a second slitting blade are both right-angled blades.
Figure 7:
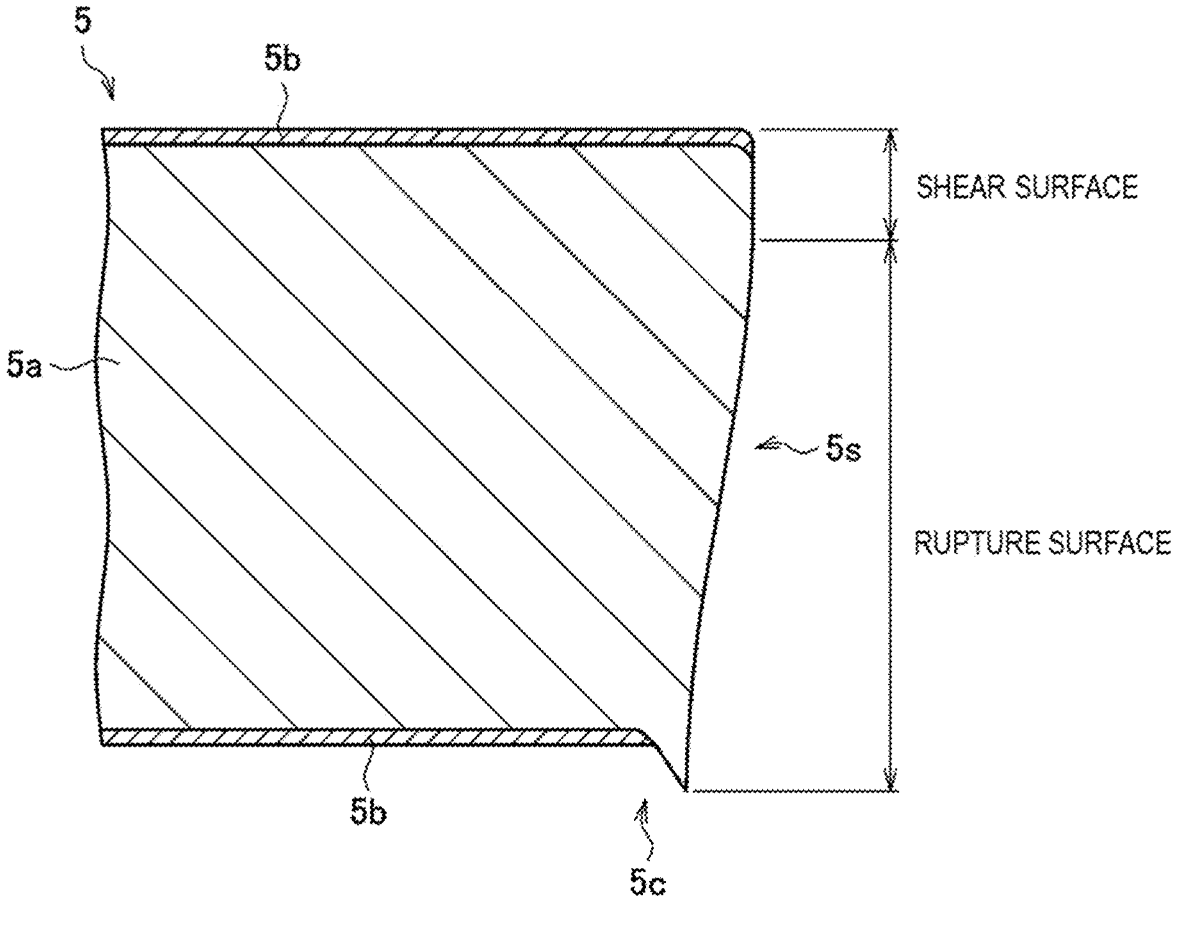
FIG. 7 is a schematic diagram illustrating a cut end surface of a plated steel sheet after being cut with the pair of slitting blades illustrated in FIG. 6.

For example, as illustrated in FIG. 6, assume that a blade portion 11*a* of a first slitting blade 11 and a blade portion 12*a* of a second slitting blade 12 both have right-angled blades in the slitting apparatus 100 illustrated in FIG. 2. At this time, when the first slitting blade 11 and the second slitting blade 12 sandwich and are pressed against the plated steel sheet 5 in which an upper surface (first surface) and a lower surface (second surface) of a base material 5*a* being a steel sheet are coated with plating layers 5*b*, shear force is applied to the plated steel sheet 5 and cuts the plated steel sheet 5. At this time, as illustrated in FIG. 7, a cut end surface 5*s* includes a shear surface and a rupture surface in this order from the upper surface. The shear surface is a smooth surface that is formed by a movement of the first slitting blade 11 pressing into the plated steel sheet 5, and the rupture surface is a surface made by a rupture of the plated steel sheet 5 that is started from a crack developing on the plated steel sheet 5. As illustrated in FIG. 7, in the cut end surface 5*s* of the plated steel sheet 5, the plating layer 5*b* little remains on the shear surface, and the base material 5*a* is exposed on the rupture surface. Therefore, an effect provided by the plating being the coating material is not exerted on such a cut end surface 5*s*, and there is a concern about occurrence of red rust on the cut end surface 5*s*.

As a result of diligent studies conducted by the inventors of the present application, the inventors obtained such a finding that cutting with a right-angled blade as illustrated in FIG. 6 produces a small shear surface, which results in a small amount of the plating is dragged from the upper surface and the lower surface into the cut end surface until the plated steel sheet 5 is cut. In addition, it was revealed that stresses concentrate at corner portions of upper and lower tools, and a crack develops in such a manner as to connect the corner portions, making a cutting timing earlier and resulting in a large exposure region of the base material 5*a* (i.e., the rupture surface).

A conceivable technique for making a larger amount of the plating is dragged into the cut end surface 5*s* of the plated steel sheet 5 is, for example, to give corner portions of blade portions a predetermined curvature radius to round off the corner portions (i.e., to make the corner portions have R-shapes). By making the corner portions of the blade portions have R-shapes, the plating of the plating layers 5*b* of the plated steel sheet 5 is dragged into the cut end surface 5*s* along the R-shapes of the corner portions of the blade portions when the blade portions are pressed, and the concentration of stresses at the corner portions of the tools is mitigated. Therefore, the cutting timing is delayed. Therefore, as compared to a case where the plated steel sheet 5 is cut with the right-angled blade illustrated in FIG. 6, a plating coverage on the cut end surface 5*s* is increased, and the exposure of the base material 5*a* can be reduced. However, the cutting timing is excessively delayed, which increases a burr 5*c* protruding from the rupture surface of the cut end surface 5*s* to the lower surface side.

Another conceivable technique for making a larger amount of the plating is dragged into the cut end surface 5*s* of the plated steel sheet 5 is to give inclined surfaces in a tapered shape to blade portions. In this case as well, when the blade portions are pressed, plating of the plating layers 5*b* of the plated steel sheet 5 is dragged into the cut end surface 5*s* along the inclined surfaces of the blade portions.

Therefore, the plating coverage on the cut end surface 5*s* is high as compared to a case where the plated steel sheet 5 is cut with the right-angled blades illustrated in FIG. 6. However, with angulated corner portions of the blade portions, the concentration of stresses at the corner portions of the tools is not mitigated, and a crack develops in such a manner as to connect the corner portions. Therefore, the cutting timing is not delayed, and the exposure region of the base material 5*a* (i.e., the rupture surface) is still large.

Figure 8:
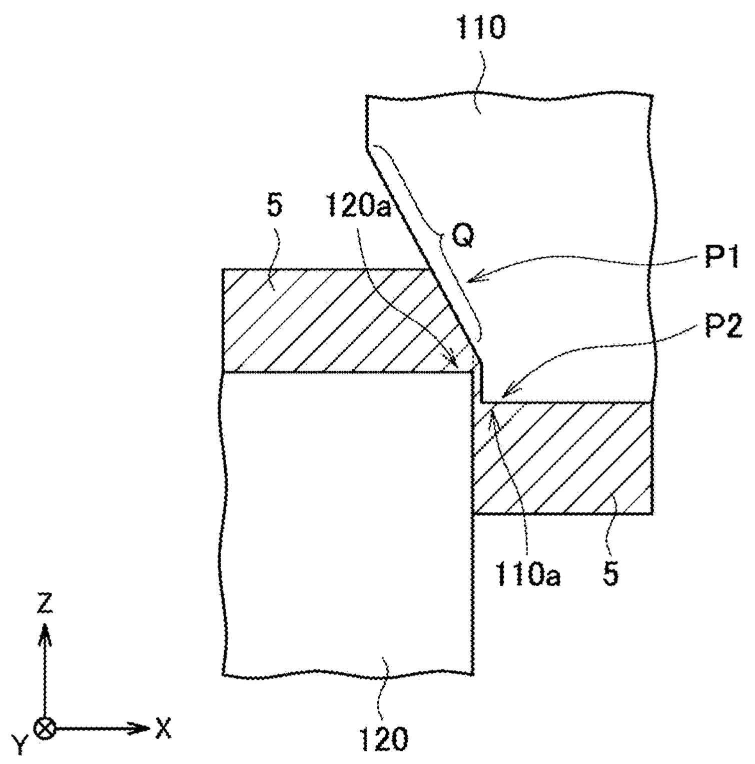
FIG. 8 is a schematic diagram illustrating how cutting is performed when a blade portion of a first slitting blade includes an inclined portion and a protruding portion, and a second slitting blade is a right-angled blade.

Thus, the inventors of the present application further conducted diligent studies and consequently found that when at least either the blade portions 110*a* of the first slitting blades 110 or the blade portions 120*a* of the second slitting blades 120 is formed into a shape having an inclined portion and a protruding portion, it is possible to increase the plating coverage on the cut end surface 5*s* of the plated steel sheet 5 without forming a large burr. That is, for example, as illustrated in FIG. 8, the blade portions 110*a* of the first slitting blades 110 may be formed into a shape having an inclined portion P1 and a protruding portion P2, and the second slitting blades 120 may be formed as right-angled blades. In addition, for example, as illustrated in FIG. 9, the blade portions 110*a* of the first slitting blades 110 and the blade portions 120*a* of the second slitting blades 120 may be formed into a shape having an inclined portion P1 and a protruding portion P2.

Figure 9:
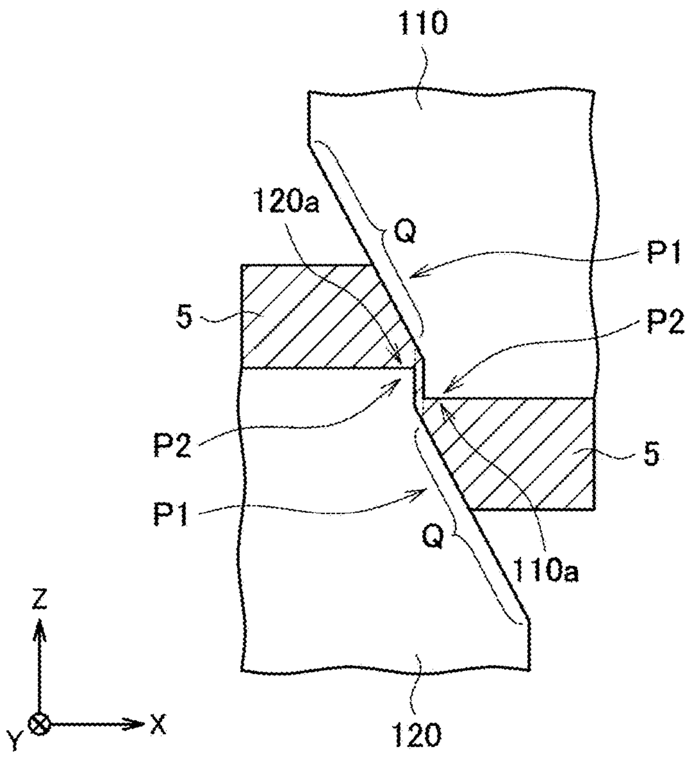
FIG. 9 is a schematic diagram illustrating how cutting is performed when a blade portion of a first slitting blade and a blade portion of a second slitting blade each include an inclined portion and a protruding portion.

At this time, in both cases illustrated in FIG. 8 and FIG. 9, the inclined portion P1 overlaps the tool facing the inclined portion P1 as viewed in the pressing direction (the Z direction). For example, in the case illustrated in FIG. 8, the inclined portion P1 of the blade portion 110*a* of the first slitting blade 110 includes an overlapping portion Q that overlaps the second slitting blade 120 facing the inclined portion P1 as viewed in the pressing direction (the Z direction). In the case illustrated in FIG. 9, the inclined portion P1 of the blade portion 110*a* of the first slitting blade 110 includes an overlapping portion Q that overlaps the second slitting blade 120 facing the inclined portion P1 as viewed in the pressing direction (the Z direction), and the inclined portion P1 of the blade portion 120*a* of the second slitting blade 120 includes an overlapping portion Q that overlaps the first slitting blade 110 facing the inclined portion P1 as viewed in the pressing direction (the Z direction).

Figure 10A:
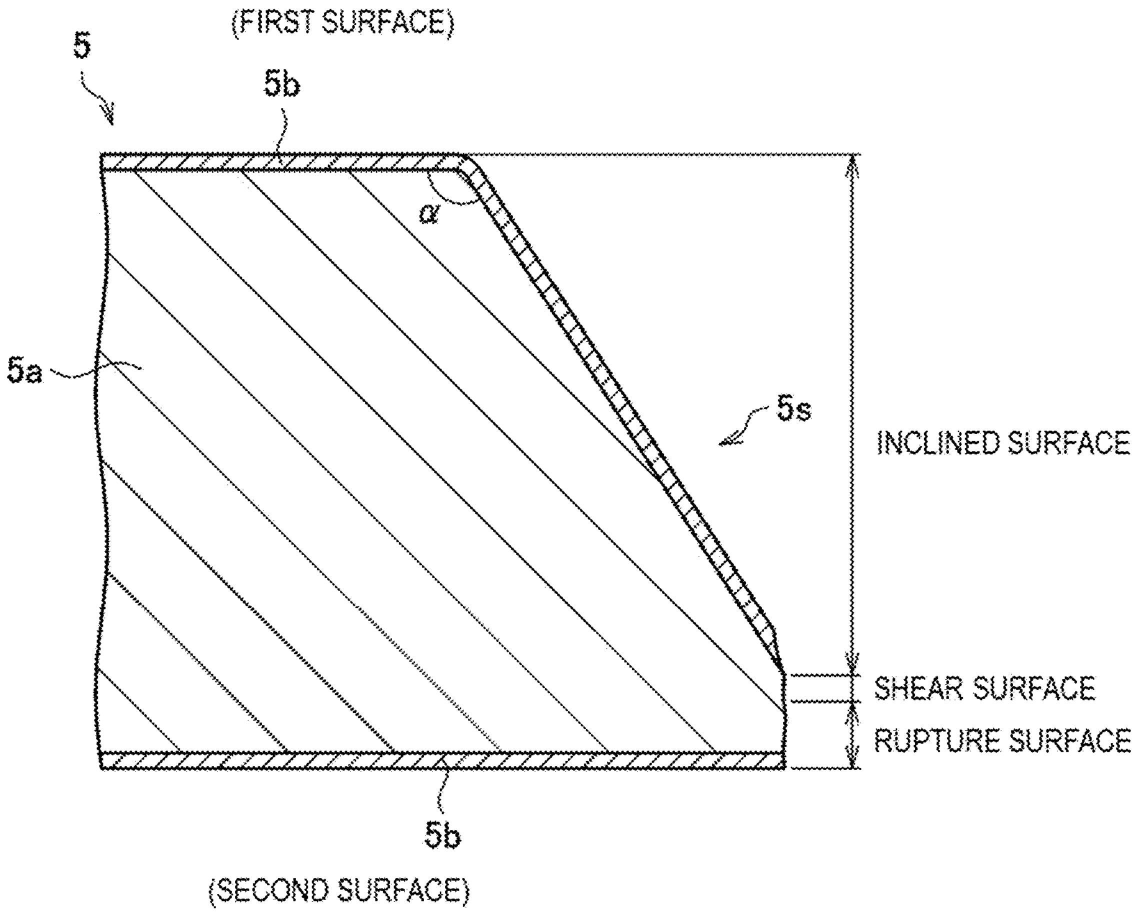
FIG. 10A is a schematic diagram illustrating an example of a cut end surface of a plated steel sheet after being cut with the pair of slitting blades illustrated in FIG. 8 or FIG. 9.
Figure 10B:
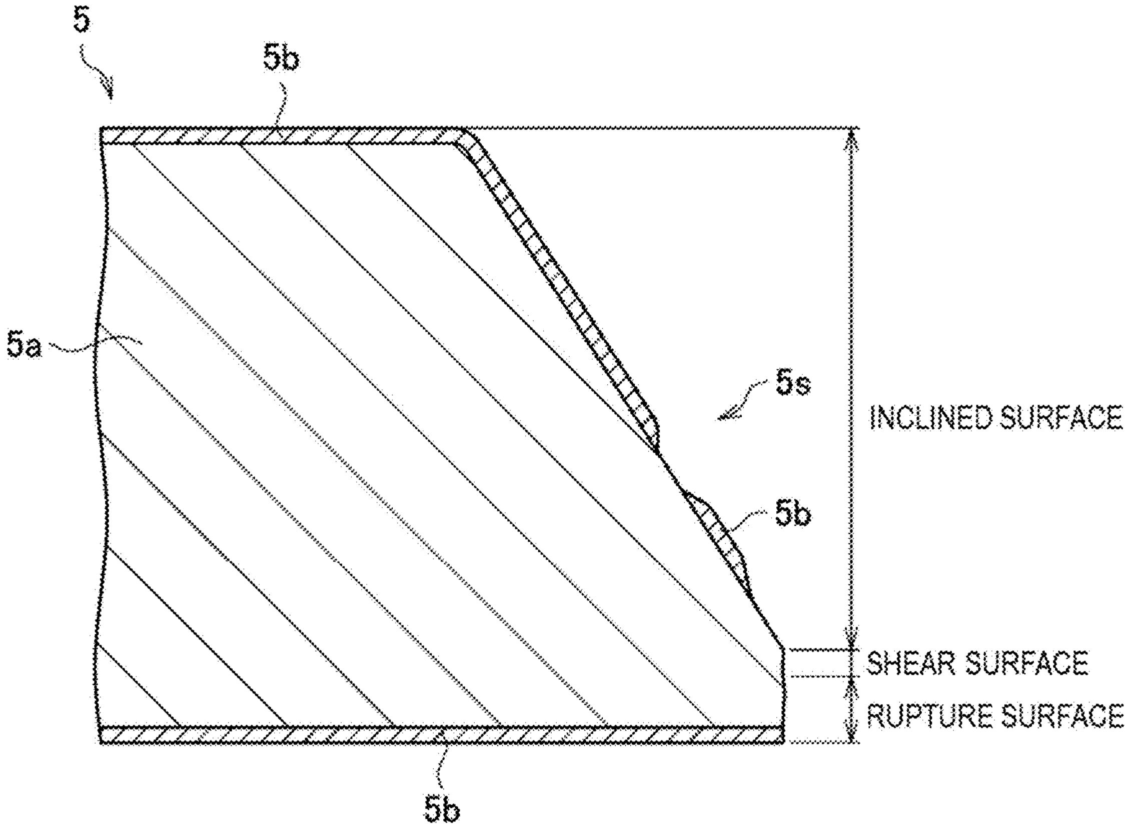
FIG. 10B is a schematic diagram illustrating another example of the cut end surface of the plated steel sheet after being cut with the pair of slitting blades illustrated in FIG. 8 or FIG. 9.

FIG. 10A and FIG. 10B illustrate examples of cut end surfaces 5*s* of plated steel sheets 5 cut by the pairs of slitting blades illustrated in FIG. 8 and FIG. 9, respectively. Note that FIG. 10A and FIG. 10B illustrate cut end surfaces 5*s* on a side on which the inclined portions P1 of the first slitting blades 110 illustrated in FIG. 8 and FIG. 9 are pressed into surfaces facing the inclined portions P1 (the upper surfaces, the first surfaces). As illustrated in FIG. 10A, the cut end surface 5*s* includes an inclined surface, a shear surface, and a rupture surface in this order from the upper surface. The inclined surface is a surface that is formed along the inclined portion P1 of the blade portion 110*a* of the first slitting blade 110 and is inclined with respect to the sheet thickness direction. The shear surface is a smooth surface that is formed by a movement of the first slitting blade 110 pressing into the plated steel sheet 5. The shear surface is slightly formed. The rupture surface is a surface made by a rupture of the plated steel sheet 5 that is started from a crack developing on the plated steel sheet 5.

On the plated steel sheet 5 having been cut, the upper surface (the first surface) intersects with the inclined surface. Here, an internal angle α between the upper surface and the inclined surface is an obtuse angle having a size of about an inclination angle (a taper angle) θ+90° of the inclined surface of the tool described later. The lower surface (the second surface) intersects with the rupture surface. The plated steel sheet 5 is cut obliquely from the upper surface side toward the lower surface side by the inclined portion P1 of the first slitting blade 110, and thus the inclined surface is formed on the cut end surface 5*s*, which is inclined in one direction from the upper surface side toward the lower surface side.

On the cut end surface 5*s* of the plated steel sheet 5, at least part of the inclined surface is coated with the coating material that is continued from the upper surface (the first surface). For example, on the cut end surface 5*s* of the plated steel sheet 5 illustrated in FIG. 10A, the plating layer 5*b* on the upper surface is dragged into the inclined surface, and the inclined surface is coated with the plating layer 5*b*. The inclined surface in FIG. 10A is entirely coated with the plating layer 5*b* continued from the upper surface (the first surface). However, depending on how the steel sheet is cut, for example, the plating layer 5*b* on the upper surface which is dragged into the inclined surface may become fragmentary, which makes the inclined surface discontinuously coated with plating layers 5*b* as with the cut end surface 5*s* of the plated steel sheet 5 illustrated in FIG. 10B. In this case as well, the inclined surface includes a portion in which the inclined surface is coated with the plating layer 5*b* continued from the upper surface (the first surface), and thus, on the cut end surface 5*s*, it is possible to obtain an effect provided by the plating being a coating material. Furthermore, as illustrated in FIG. 10A and FIG. 10B, the shear surface on which the plating little remains and the rupture surface on which the base material 5*a* is exposed are slightly present on the cut end surface 5*s*, and thus, also on the cut end surface 5*s*, it is possible to obtain the effect provided by the plating being a coating material.

In addition, with each of the pairs of slitting blades illustrated in FIG. 8 and FIG. 9, a final cut that produces the rupture surface is performed with the protruding portion P2 having a substantially right-angle corner portion. Therefore, formation of a large burr is prevented. Note that, in the sheet thickness direction, a length of the rupture surface of the plated steel sheet 5 cut by the pair of slitting blades according to the present embodiment is desirably 30% or less of the sheet thickness of the plated steel sheet 5 being a multi-layered material. Accordingly, on the cut end surface 5*s*, a region in which the base material 5*a* is exposed can be decreased.

Note that, as illustrated in FIG. 8, in a case where the blade portions 110*a* of the first slitting blades 110 are formed into a shape having an inclined portion P1 and a protruding portion P2, and the second slitting blades 120 are formed as right-angled blades, one of two pieces into which the plated steel sheet 5 is divided includes the cut end surface 5*s* as illustrated in FIG. 10A or FIG. 10B (a post-cut plated steel sheet Sa in FIG. 4). However, a cut end surface 5*s* of the other of the two pieces of the plated steel sheet 5 is not coated with the plating. Therefore, the other is scrapped (a post-cut plated steel sheet Sb in FIG. 4). As illustrated in FIG. 9, when the blade portions 110*a* of the first slitting blades 110 and the blade portions 120*a* of the second slitting blades 120 each have the shape having the inclined portion P1 and the protruding portion P2, both two pieces into which the plated steel sheet 5 is divided after being cut can include the cut end surfaces 5*s* as illustrated in FIG. 10A and FIG. 10B (post-cut plated steel sheets Sa in FIG. 5).

[3. Shape of Blade Portion]

Figure 11:
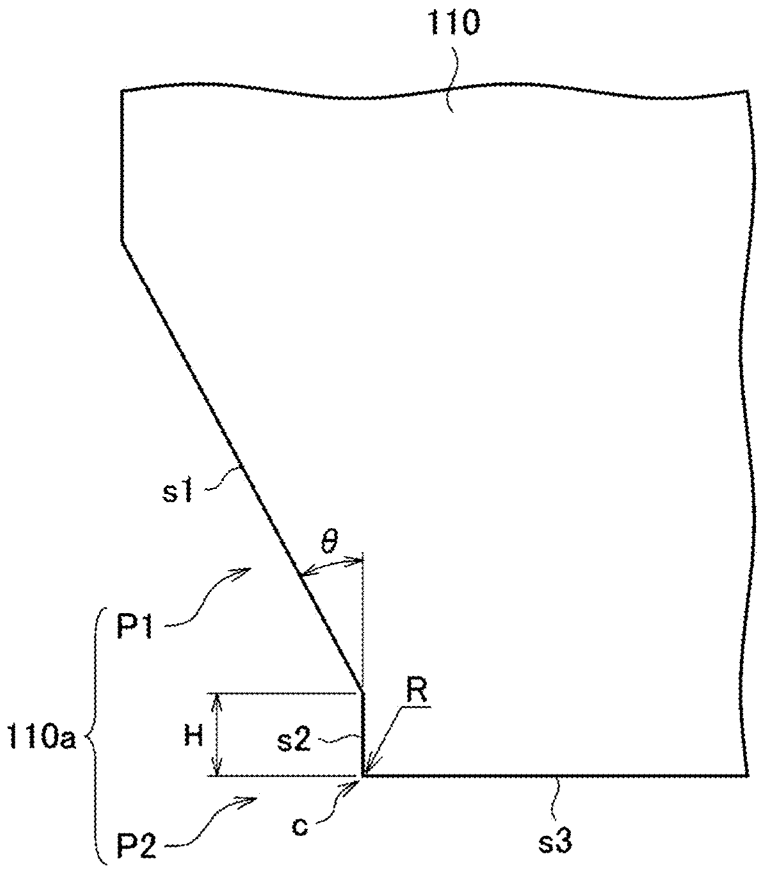
FIG. 11 is a schematic diagram illustrating a sectional shape of a blade portion of a first slitting blade according to the embodiment.

Hereinafter, based on FIG. 11, a shape of the blade portion including the inclined portion P1 and the protruding portion P2 will be described in detail. FIG. 11 is a schematic diagram illustrating a sectional shape of the blade portion 110*a* of the first slitting blade 110 according to the present embodiment. FIG. 11 illustrates an enlarged view of the blade portion 110*a* when the first slitting blade 110 is cut in a plane including a rotation axis of the slitting blade 110. Note that, in a case where the blade portion 120*a* of the second slitting blade 120 includes the inclined portion P1 and the protruding portion P2, a shape of the blade portion 120*a* is the same as illustrated in FIG. 11. Therefore, the blade portion 110*a* of the first slitting blade 110 will be described here as an example. In addition, the plated steel sheet 5 will be mentioned and described below as an example of a multi-layered material being a cutting object.

The blade portion 110*a* having the sectional shape illustrated in FIG. 11 includes an inclined portion P1 and a protruding portion P2. The inclined portion P1 includes a tool inclined surface s1 that is inclined with respect to the pressing direction. The protruding portion P2 includes a vertical wall surface s2 extending from the tool inclined surface s1 along the pressing direction and includes a pressing surface s3 perpendicular to the vertical wall surface s2. Such a blade portion 110*a* desirably satisfies the following shape.

(Inclination Angle (Taper Angle) θ of Tool Inclined Surface)

The inclination angle (the taper angle) θ of the tool inclined surface s1 with respect to the pressing direction is desirably set to 15° or more to 45° or less. When the inclination angle θ is 15° or more, it is possible to ensure a cutting timing that allows the plating of the plating layer 5*b* of the plated steel sheet 5 to be sufficiently dragged into the inclined surface. If the inclination angle θ is about 5°, the cutting timing is as early as the cutting timing in the case of the right-angled blade.

At the same time, the slitting blade 110 experiences not only a load in the pressing direction (a vertical direction) but also a load in an axial direction (a horizontal direction). The larger the inclination angle θ becomes, the heavier the load in the axial direction (the horizontal direction) becomes, which imposes an excessive load on the facility. When the inclination angle θ is 45° or less, the load in the axial direction (the horizontal direction) applied on the slitting blade 110 does not become excessively heavy, and thus the cutting can be performed under a load up to a withstand load of the facility. If the inclination angle θ is increased to more than 45°, an increase in an effect of dragging the plating obtained by an increase in the load is not significant for the increased inclination angle θ. Therefore, the inclination angle (the taper angle) e of the tool inclined surface s1 with respect to the pressing direction is preferably set to 15° or more to 45° or less.

(Length H of Vertical Wall Surface)

A length H of the vertical wall surface s2 in the pressing direction is desirably 0.1 mm or more to less than the sheet thickness of the plated steel sheet 5 being a cutting object. When the length H of the vertical wall surface s2 is 0.1 mm or more, a burr that is formed on the cut end surface 5*s* of the plated steel sheet 5 after being cut can be kept within an allowable range. In addition, by setting the length H of the vertical wall surface s2 to 0.1 mm or more, the blade portion 110*a* can be easily machined. The blade portion 110*a* of the slitting blade 110 wears with its use. When the length H of the vertical wall surface s2 is set to 0.1 mm or more, it is possible to keep a lifetime of the slitting blade 110 against wear and to decrease the number of replacements.

At the same time, by setting the length H of the vertical wall surface s2 to less than a sheet thickness of the plated steel sheet 5 being a cutting object, it is possible to avoid the same cutting as in the case of the right-angled blade. For example, in a case where cutting a plated steel sheet 5 having a sheet thickness of 1.0 mm to 4.5 mm is assumed, it suffices that the length H of the vertical wall surface s2 is set to be shorter than 1.0 mm, which is the minimum sheet thickness, for example, 0.8 mm. In a case where a minimum sheet thickness of the plated steel sheet 5 being a cutting object is 3.0 mm, it suffices that the length H of the vertical wall surface s2 is set to, for example, 1.6 mm.

As seen from the above, the length H of the vertical wall surface s2 in the pressing direction is preferably set to 0.1 mm or more to less than the sheet thickness of the plated steel sheet 5 being a cutting object.

(Curvature Radius R of Corner Portion)

A curvature radius R of a corner portion c at which the vertical wall surface s2 and the pressing surface s3 intersect with each other is desirably set to 0.1 mm or less. By setting the curvature radius R of the corner portion c to 0.1 mm or less, it is possible to make a formed burr small. For example, the curvature radius R of the corner portion c may be about 0.05 mm. The curvature radius R of the corner portion c is independent of the sheet thickness of the plated steel sheet 5 being a cutting object. It suffices that the curvature radius R is set as appropriate in accordance with a material or the like of the plated steel sheet 5.

The shape of the blade portion 110*a* is formed as described above, and as illustrated in FIG. 8 and FIG. 9, the slitting blade 110 having the shape of the blade portion 110*a* is disposed such that the tool inclined surface s1 overlaps the slitting blade facing the tool inclined surface s1 as viewed in the pressing direction. When the plated steel sheet 5 is cut with such a slitting blade 110, the inclined portion P1 of the blade portion 110*a* compresses the plating of the plating layer 5*b* together with the base material 5*a* in the pressing direction (the sheet thickness direction), thus making the plating is dragged into the cut end surface, and additionally applies compressive stress, thus delaying the cutting timing, so that the inclined surface can be coated with the plating. Thus, the effect provided by the plating being a coating material can be enhanced on the cut end surface. In addition, by completely cutting the plated steel sheet 5 with the protruding portion P2 of the blade portion 110*a*, the formation of a large burr can be prevented.

EXAMPLE (A. Examination by Blanking Serving as Simulation of Slit Cutting)

Blanking that served as a simulation of slit cutting was performed to examine the effect according to the present invention. In the present examination, blanking with pieces of blanking press tooling that served as a simulation of slit cutting with the slitting apparatus 100 illustrated in FIG. 2 was performed. As a multi-layered material being a cutting object, a 400 N-class Zn—Al—Mg ternary alloy plated steel sheet having a sheet thickness of 3.2 mm was used.

Figure 12:
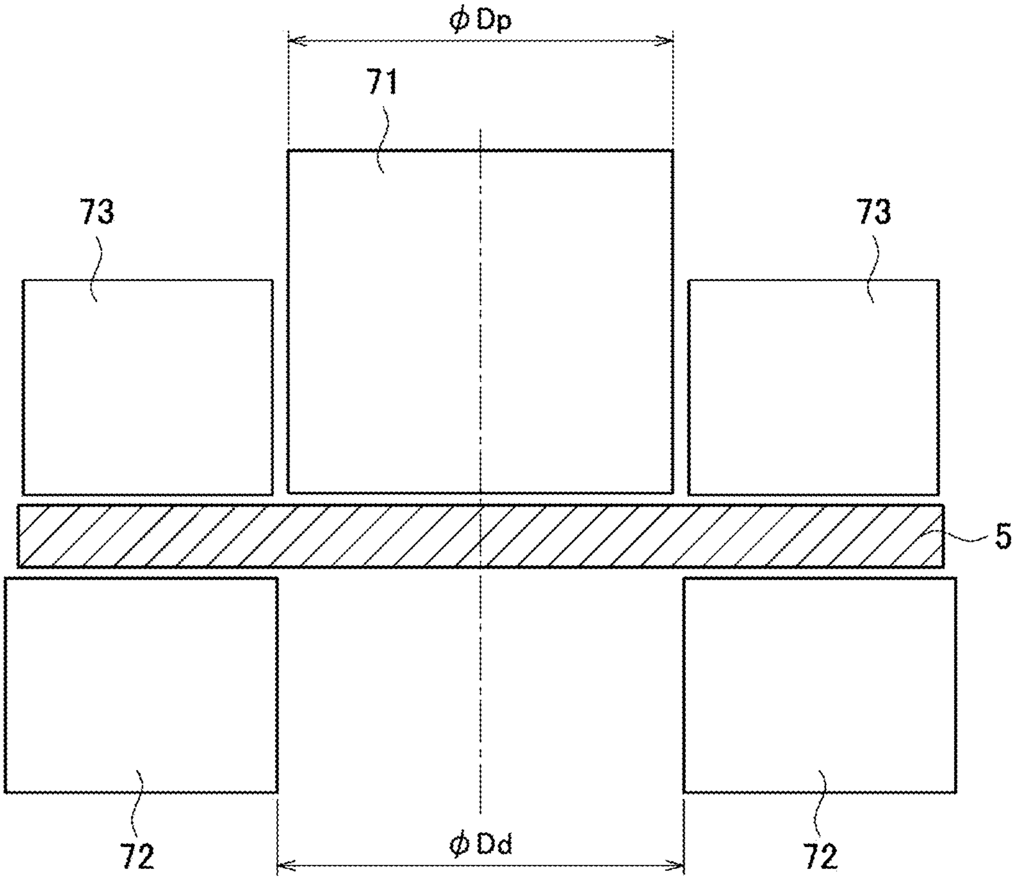
FIG. 12 is an explanatory diagram illustrating blanking with pieces of blanking press tooling in a comparative example.

In a comparative example, pieces of blanking press tooling as illustrated in FIG. 12 that include a punch 71 having an outer diameter Dp, a die 72 having an inner diameter Dd, and a blank holder 73 were used. The punch 71 and the die 72 had right-angled blades. With the blank holder 73 holding a plated steel sheet 5 placed on the die 72, the plated steel sheet 5 was blanked by pressing the punch 71 from the blank holder 73 side.

Figure 13:
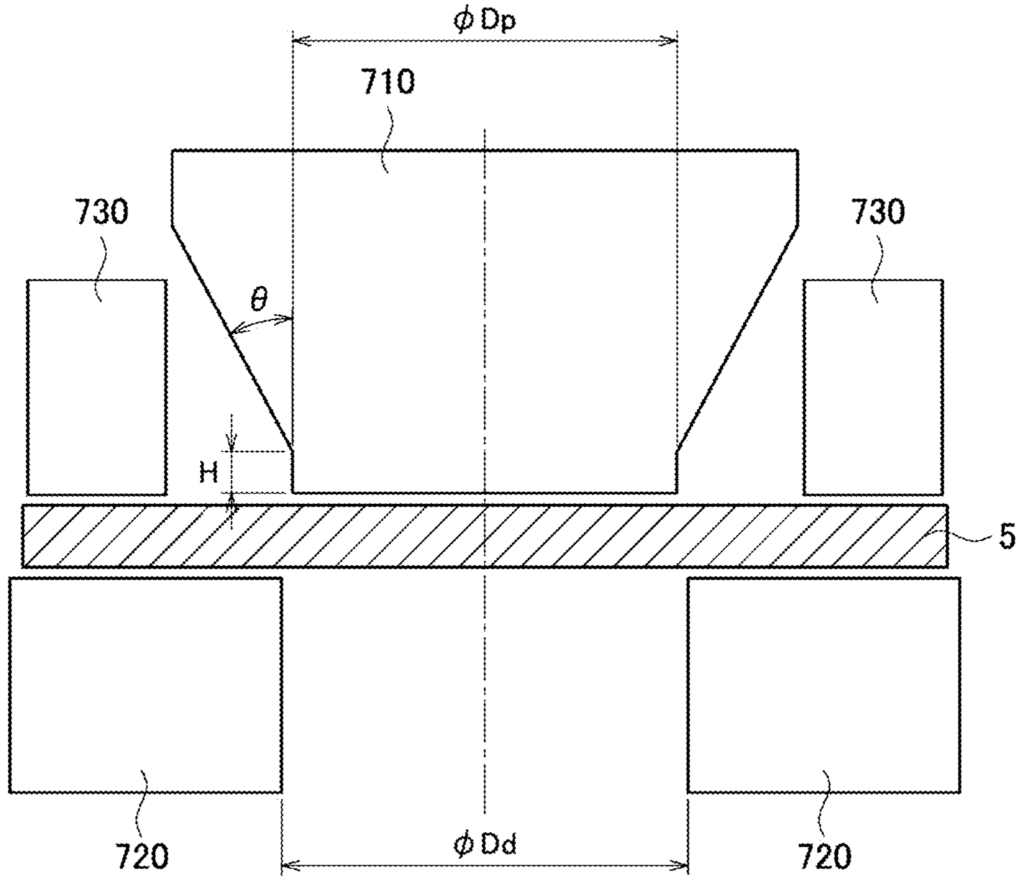
FIG. 13 is an explanatory diagram illustrating blanking with pieces of blanking press tooling in an inventive example.

In an inventive example, pieces of blanking press tooling as illustrated in FIG. 13 that include a punch 710 having the outer diameter Dp, a die 720 having the inner diameter Dd, and a blank holder 730 were used. A blade portion of the punch 710 included an inclined portion with an inclination angle θ and a protruding portion with a vertical wall surface having a height H. A corner portion of the protruding portion had a curvature radius of 0.05 mm. The punch 710 was disposed such that the inclined portion overlaps the die 720 facing the punch 710 as viewed in a blanking direction. As in the comparative example, with the blank holder 730 holding a plated steel sheet 5 placed on the die 720, the plated steel sheet 5 was blanked by pressing the punch 710 from the blank holder 730 side.

(A-1. Rupture Timing)

Figure 14:
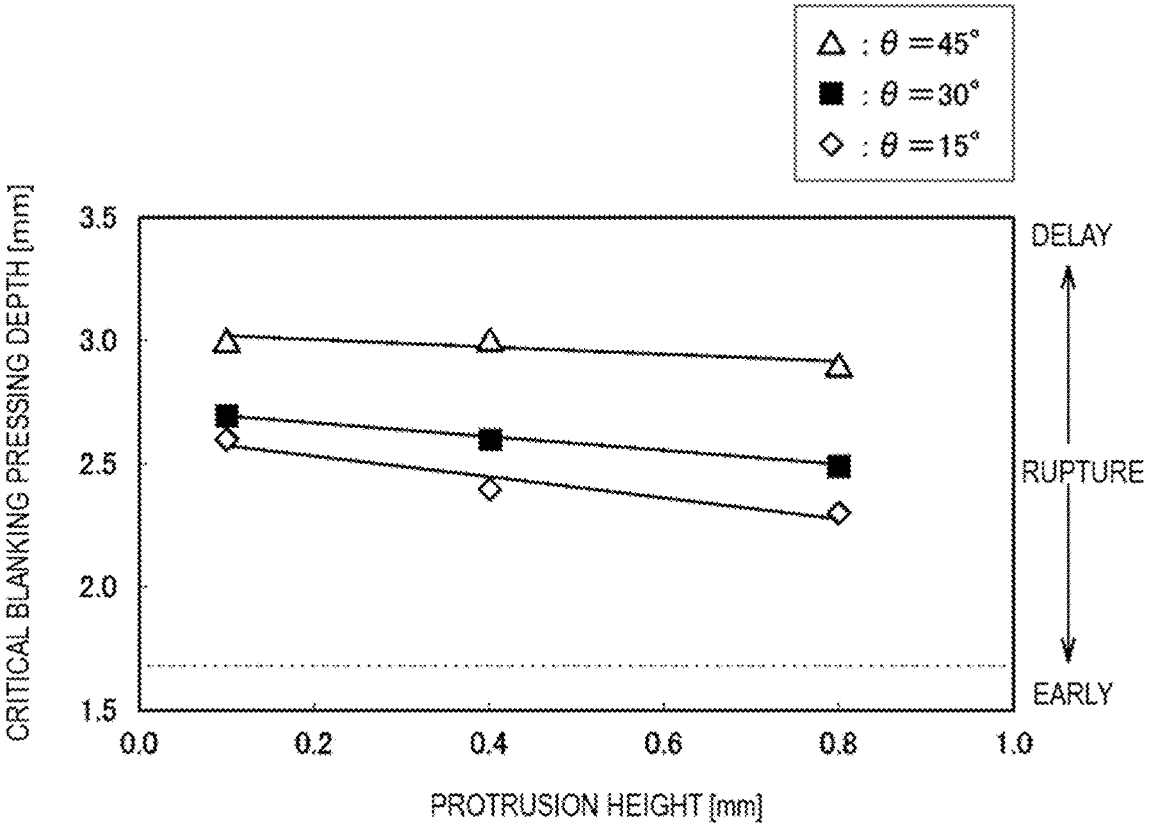
FIG. 14 is a graph illustrating a relationship between a length (a protrusion height) H of a vertical wall surface of a protruding portion and a critical blanking pressing depth.

First, using the pieces of blanking press tooling in the inventive example illustrated in FIG. 13, a relationship between the length (a protrusion height) H of the vertical wall surface of the protruding portion and a critical blanking pressing depth. The critical blanking pressing depth is a pressing depth of the punch 710 from a start of pressing the punch 710 up to development of a crack and rupture of the cutting object. It can be said that the greater the critical blanking pressing depth is, the later the rupture timing is. Here, the length (the protrusion height) H of the vertical wall surface of the protruding portion was changed to 0.1 mm, 0.4 mm, and 0.8 mm for each of inclination angles θ of the inclined portion of 15°, 30°, and 45°. Results of the examination are shown in FIG. 14. A broken line in FIG. 14 indicates a critical blanking pressing depth when the pieces of blanking press tooling in the comparative example illustrated in FIG. 12 were used.

As illustrated in FIG. 14, when machining was performed using the pieces of pressing press tooling in the inventive example, the critical blanking pressing depth can be increased as compared to a case where machining was performed using the pieces of pressing press tooling in the comparative example. In addition, it was found that the critical blanking pressing depth was increased with an increase in the inclination angle θ of the inclined portion, and the critical blanking pressing depth was increased with a decrease in the length (the protrusion height) H of the vertical wall surface of the protruding portion. That is, it was demonstrated that the rupture timing of the plated steel sheet 5 due to the development of a crack is delayed with an increase in the inclination angle θ of the inclined portion and with a decrease in the length (the protrusion height) H of the vertical wall surface of the protruding portion.

(A-2. Ratio of Remaining Plating on Cut End Surface)

Next, using the pieces of blanking press tooling in the inventive example illustrated in FIG. 13, a relationship between the length (the protrusion height) H of the vertical wall surface of the protruding portion and a ratio of remaining plating on the cut end surface. The ratio of remaining plating is a proportion of a length of a remaining plating region in the sheet thickness direction (hereinafter, also referred to as a "remaining plating region height") Hp [mm] with respect to a sheet thickness t [mm] of the plated steel sheet 5 and is given by Formula (1) shown below. In the present examination, cut end surfaces were analyzed under a scanning electron microscope (SEM). Zn being a principal component of the plating and Fe being a principal component of the base material were measured, and a region in which a proportion of Zn is not less than a predetermined proportion was identified as the remaining plating region. The cut end surfaces analyzed were obtained by subjecting the plated steel sheet 5 to the pressing, with the length (the protrusion height) H of the vertical wall surface of the protruding portion being changed to 0.1 mm, 0.4 mm, and 0.8 mm for each of inclination angles θ of the inclined portion of 15°, 30°, and 45°.

$$\text{Ratio of remaining plating}[\%]=Hp/t\times 100 \quad (1)$$

Figure 15:
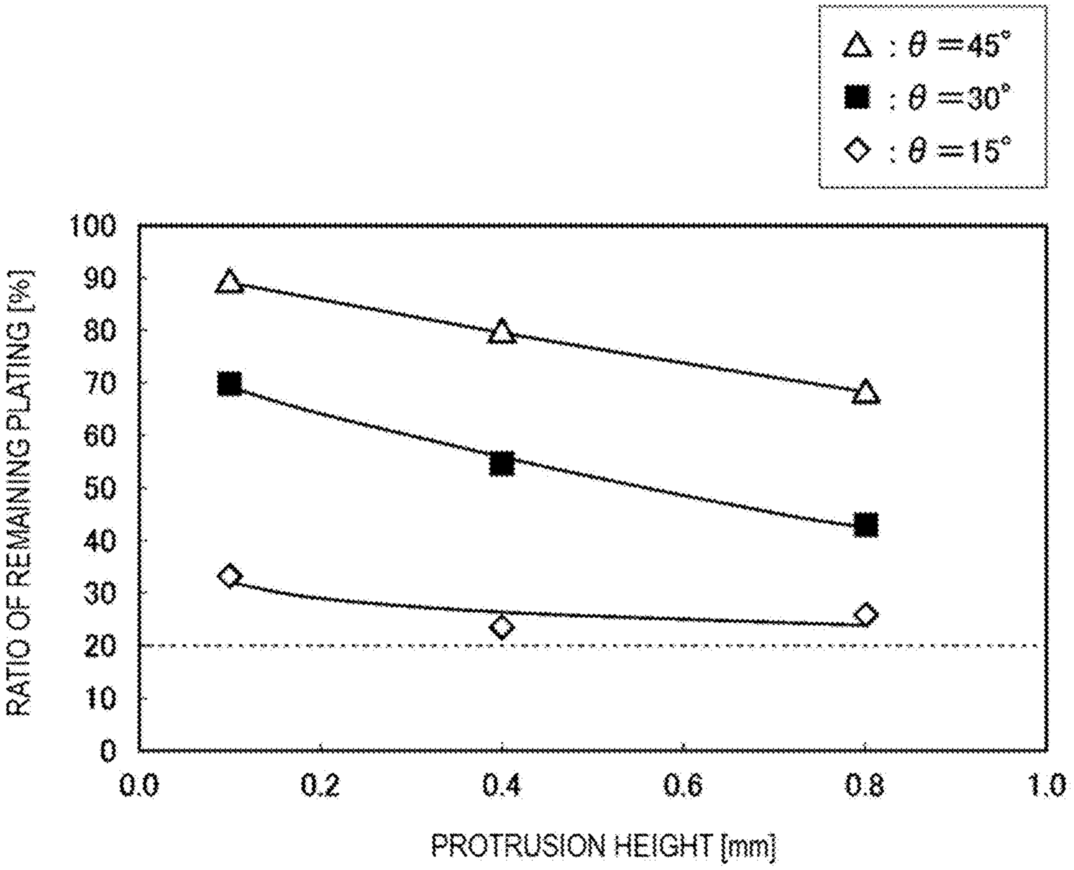
FIG. 15 is a graph illustrating a relationship between a length (a protrusion height) H of a vertical wall surface of a protruding portion and a ratio of remaining plating on a cut end surface.

Results of the examination are shown in FIG. 15. A broken line in FIG. 15 indicates a ratio of remaining plating when the pieces of blanking press tooling in the comparative example illustrated in FIG. 12 were used.

As illustrated in FIG. 15, when machining was performed using the pieces of pressing press tooling in the inventive example, the ratio of remaining plating can be increased as compared to a case where machining was performed using the pieces of pressing press tooling in the comparative example. In addition, it was found that the ratio of remaining plating was increased with an increase in the inclination angle θ of the inclined portion, and the ratio of remaining plating was increased with a decrease in the length (the protrusion height) H of the vertical wall surface of the protruding portion. That is, it was demonstrated that the ratio of remaining plating is increased with an increase in the inclination angle θ of the inclined portion and with a decrease in the length (the protrusion height) H of the vertical wall surface of the protruding portion.

Figure 16:
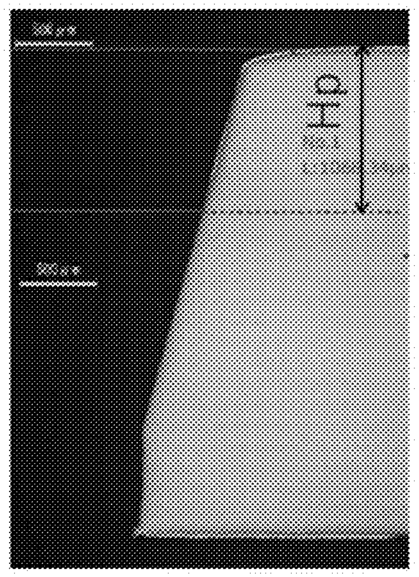
FIG. 16 shows pictures of sections of plated steel sheets subjected to blanking with the pieces of blanking press tooling in the inventive example.
Figure 16:
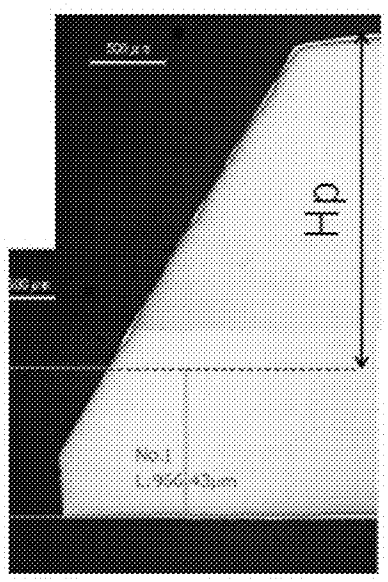
Figure 16:
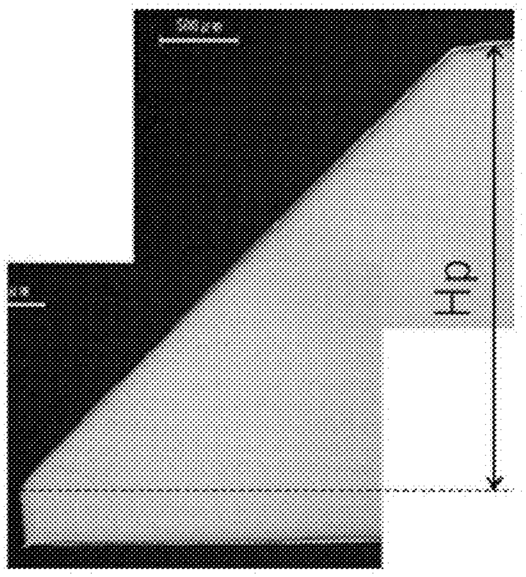

FIG. 16 illustrates pictures of sections and remaining plating region heights Hp of plated steel sheets 5 after being cut when the length (the protrusion height) H of the vertical wall surface of the protruding portion was 0.1 mm, and the inclination angle θ of the inclined portion was 15°, 30°, and 45°. FIG. 16 also shows that the remaining plating region height Hp is increased with an increase in the inclination angle θ of the inclined portion when the length (the protrusion height) H of the vertical wall surface of the protruding portion is constant.

(B. Examination by Slit Cutting)

Next, a slit cutting test was conducted to examine the effect according to the present invention. In the present examination, slit cutting test machines each including a pair of slitting blades were used to perform slit cutting of a plated steel sheet. As a multi-layered material being a cutting object, a 400 N-class Zn—Al—Mg ternary alloy plated steel sheet having a sheet thickness of 3.2 mm was used.

In a comparative example, a slit cutting test machine as illustrated in FIG. 6 that included a pair of slitting blades both including right-angled blades was used to perform slit cutting of a plated steel sheet 5. A clearance between the pair of slitting blades was 0.35 mm.

In the inventive example, a slit cutting test machine as illustrated in FIG. 8 that included a pair of slitting blades one of which included a blade portion including an inclined portion with an inclination angle θ and a protruding portion with a vertical wall surface having a height H and the other of which was a right-angled blade was used to perform slit cutting of a plated steel sheet 5. The inclination angle θ of the inclined portion was 45°, and the height H of the vertical wall surface of the protruding portion was 0.1 mm. The one slitting blade was disposed such that the inclined portion overlapped the other slitting blade facing the one slitting blade as viewed in the pressing direction.

Figure 17:
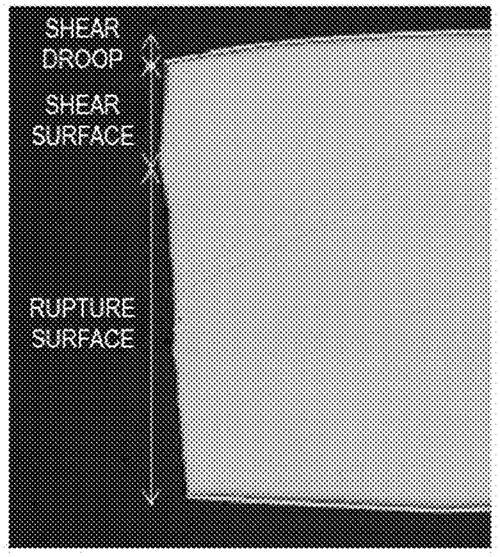
FIG. 17 shows pictures of sections of plated steel sheets after being cut.
Figure 17:
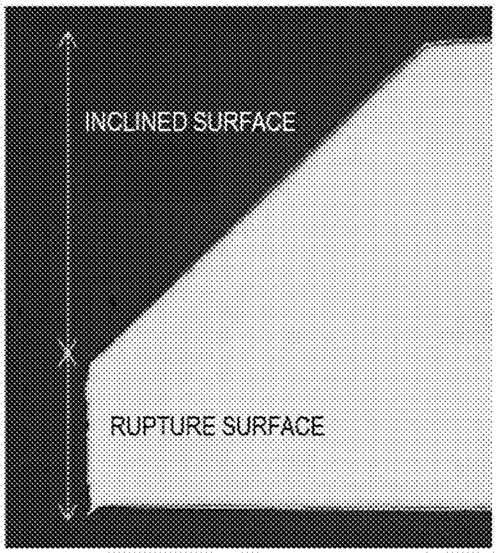

FIG. 17 illustrates pictures of sections of plated steel sheets 5 after being cut. As illustrated in FIG. 17, a cut end surface in the comparative example included a shear droop, a shear surface, and a rupture surface from its upper surface side, and it can be seen that the plating of the plating layer on its surface did not be dragged into the shear surface and the rupture surface. In contrast, a cut end surface in the inventive example included an inclined surface and a rupture surface from its upper surface side. Although hardly seen, its shear surface was slightly present between the inclined surface and the rupture surface. It can be seen that, on the cut end surface in the inventive example, the plating of the plating layer on its surface is dragged into the inclined surface. Although a burr is slightly formed on the lower surface side, the burr is allowably minute. As seen from the above, it is understood that, when a plated steel sheet is subjected to slit cutting using the pair of slitting blades in the inventive example, the plating coverage of its cut end surface is increased as compared to the case where a plated steel sheet is subjected to slit cutting using the pair of slitting blades in the comparative example.

In addition, since the inclination angle of the inclined surface of the cut end surface in the inventive example was about 45°, which was the same as the inclination angle θ of the inclined portion of the slitting blade, it is demonstrated that the inclined surface of the cut end surface was formed by the inclined portion of the slitting blade.

Figure 18:
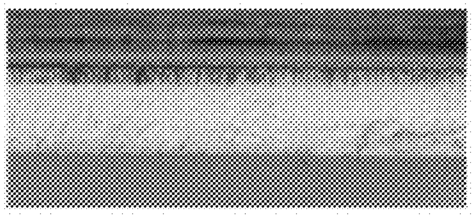
FIG. 18 shows pictures of sections depicting results of an exposure test.
Figure 18:
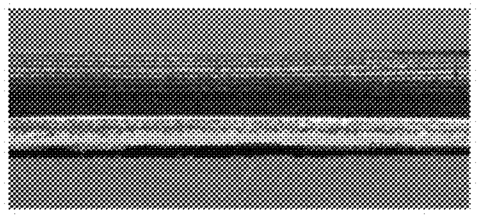
Figure 18:
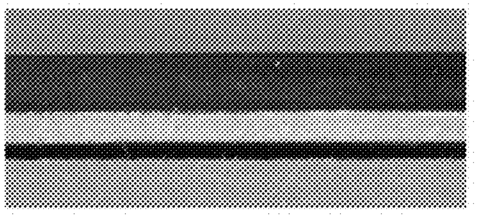
Figure 18:
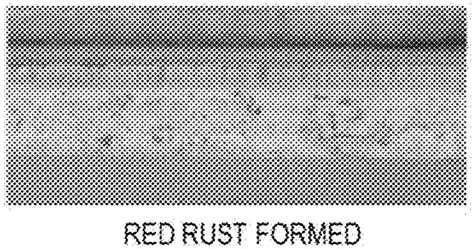
Figure 18:
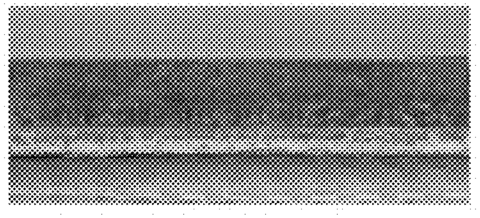
Figure 18:
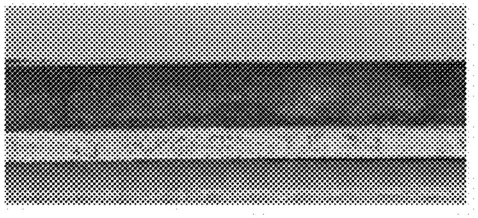
Figure 18:
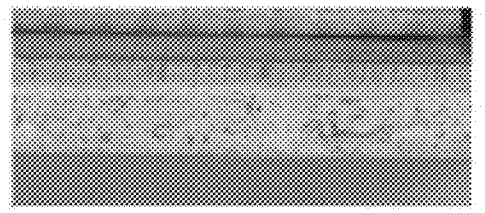
Figure 18:
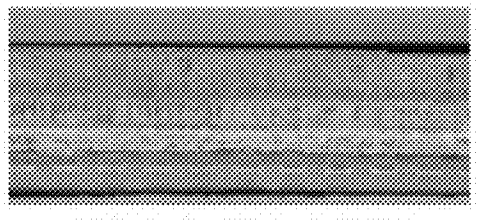
Figure 18:
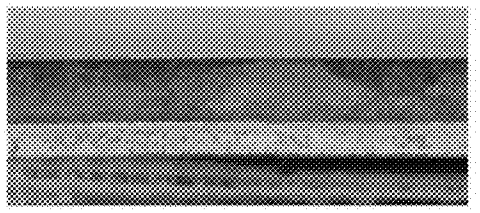

FIG. 18 illustrates results of an exposure test conducted on a plated steel sheet that is cut with the pair of slitting blades in the comparative example and plated steel sheets that are cut with the pairs of slitting blades in inventive examples. The plated steel sheet after being cut in the comparative example included the cut end surface illustrated in FIG. 17, and its ratio of remaining plating was 17.8%. In contrast, in the inventive examples, the blade portion of one of the pair of slitting blades illustrated in FIG. 8 was changed in the inclination angle θ of its inclined portion and the height H of the vertical wall surface of its protruding portion, and two types of plated steel sheets after being cut with the slitting blades were prepared. In an inventive example 1, the exposure test was conducted on a plated steel sheet that was cut with a slitting blade including a blade portion with an inclined portion having an inclination angle θ of 30° and a protruding portion including a vertical wall surface having a height H of 0.4 mm. A ratio of remaining plating of the inventive example 1 was 74.1%. In an inventive example 2, the exposure test was conducted on a plated steel sheet that was cut with a slitting blade including a blade portion with an inclined portion having an inclination angle θ of 45° and a protruding portion including a vertical wall surface having a height H of 0.1 mm. A plated steel sheet after being cut in the inventive example 2 included the cut end surface illustrated in FIG. 17, and its ratio of remaining plating was 69.5%.

As illustrated in FIG. 18, in the comparative example, red rust formed on its rupture surface after a lapse of two weeks from a start of the exposure test. In contrast, in the inventive examples 1 and 2, red rust slightly formed on their rupture surfaces after a lapse of four weeks from a start of the exposure test. However, regions of their rupture surfaces were narrow. Therefore, the red rust on their cut end surfaces was inconspicuous, and there was no appearance problem.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

For example, the above embodiment is described about the slitting apparatus including the pair of slitting blades as a cutting apparatus. However, the present invention is not limited to this example. For example, it suffices that the cutting apparatus according to the present invention includes the first tool and the second tool, and that the blade portion of at least any one of the first tool and the second tool includes the inclined portion with the tool inclined surface inclined with respect to the pressing direction and includes the protruding portion that includes the vertical wall surface extending from the tool inclined surface along the pressing direction and the pressing surface perpendicular to the vertical wall surface and protrudes from the inclined portion in the pressing direction. At this time, the tools are disposed such that the inclined portion of one of the tools overlaps the other of the tools facing the one of the tools as viewed in the pressing direction. For example, the cutting apparatus may be pieces of pressing press tooling for blanking, a shear cutting machine, or the like.

Figure 19:
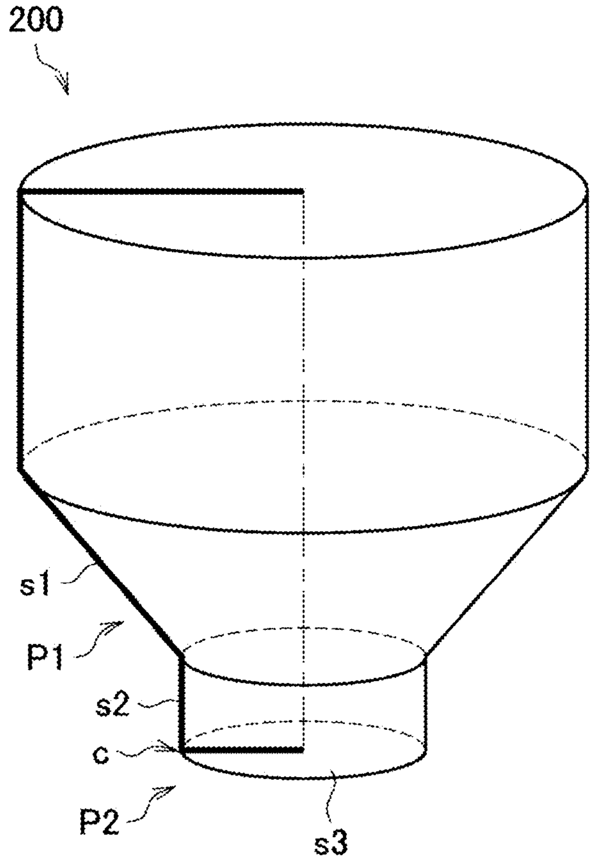
FIG. 19 is a schematic diagram illustrating an example of a blade portion of a punch (a tool) of pieces of pressing press tooling.

The pieces of pressing press tooling include, as illustrated in FIG. 13 for example, a punch and a die. At this time, for example, a punch 200 having a shape as illustrated in FIG. 19 is used. The punch 200 includes an inclined portion P1 including a tool inclined surface s1 and includes a protruding portion P2 that includes a vertical wall surface s2 extending from the tool inclined surface s1 along the pressing direction and a pressing surface s3 perpendicular to the vertical wall surface s2 and protrudes from the inclined portion P1 in the pressing direction. A shape of a section of the punch 200 passing through a central axis of the punch 200 is the same as illustrated in FIG. 11.

Figure 20:
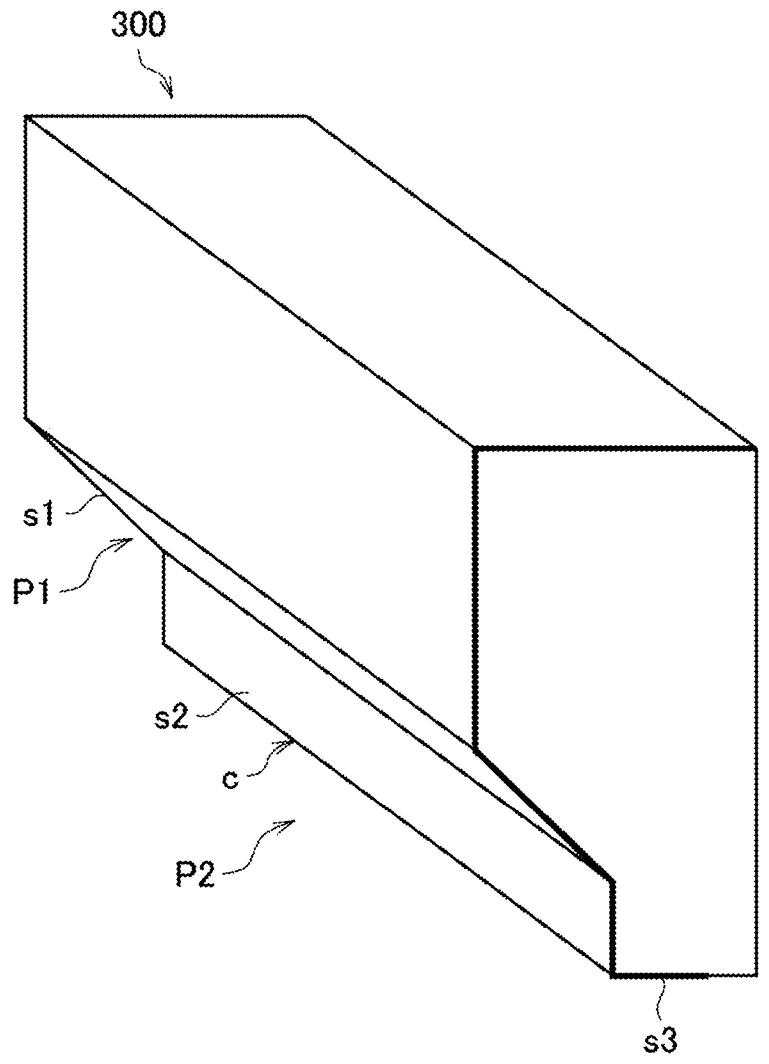
FIG. 20 is a schematic diagram illustrating an example of a blade portion of a shear (a tool) of a shear cutting machine.

For example, a shear of the shear cutting machine may be formed into a shape of a shear 300 illustrated in FIG. 20. The shear 300 includes an inclined portion P1 including a tool inclined surface s1 and includes a protruding portion P2 that includes a vertical wall surface s2 extending from the tool inclined surface s1 along the pressing direction and a pressing surface s3 perpendicular to the vertical wall surface s2 and protrudes from the inclined portion P1 in the pressing direction. A side shape of the shear 300 is the same as illustrated in FIG. 11.

As described above, it suffices that the blade portion of at least any one of the first tool and the second tool of the cutting apparatus according to the present embodiment has the sectional shape as illustrated in FIG. 11.

Note that, in a case where pieces of pressing press tooling are used, only one of cut multi-layered materials is generally used as a product. Therefore, it suffices that any one of the first tool and the second tool includes the blade portion having the sectional shape as illustrated in FIG. 11. In contrast, in a case where a slitting apparatus or a shear cutting machine is used, all of cut multi-layered materials may be used as products. Therefore, both the first tool and the second tool may be made to include the blade portions having the sectional shape as illustrated in FIG. 11.

For example, in the above embodiment, the multi-layered material is a plated steel sheet. However, any multi-layered material that is formed by coating surfaces of a base material with a coating material may be used. For example, the base material is not only a steel sheet and may be another type of metallic material. The coating material may be a material made of Zn, Al, or an alloy of Zn and Al, an oxide coating, a coating material, a resin material, or the like. Incidentally, the multi-layered material may be a coated steel sheet in which surfaces of a metallic material being a base material are coated or may be a film-laminated steel sheet in which a film is laminated on a steel sheet. Alternatively, the coating material may be a clad material. For example, the multi-layered material may be a Ni-clad copper material that includes a Cu sheet as its base material and a Ni sheet as its coating material.

The coating material constituting the multi-layered material is not limited to a single layer and may include a plurality of layers. For example, surfaces of the plated steel sheet described above may be subjected to treatment such as chemical treatment, coating, or laminating.

The multi-layered material may be a multi-layered material that includes a resin material, such as a plastic, as its base material and a metallic material, such as Cu, Cr, Ag, Au, or Pt, as its coating material. When a resin material, such as a plastic, coated with a metal is cut, electric conductivity of its end surface is lost. In addition, if a ratio of exposure of the resin is high, the resin material is easily charged, and there is a concern about, for example, occurrence of a spark. Hence, by forming the cut end surface of such a resin material into the same shape as the cut end surface of the multi-layered material according to the present embodiment, it is possible to improve the electric conductivity of the cut end surface, thus preventing the charging.

In a case of a clad material, a demanded purpose of using the clad material subjected to cutting machining differs in accordance with a combination with a coating material and its application. However, by forming the same shape as the cut end surface of the multi-layered material according to the present embodiment, it is possible to improve corrosion resistance, chemical resistance, and the like of the base material on a cut end surface of the clad material by virtue of the effect provided by the coating material. In addition, electric conductivity, thermal conductivity, magnetism, and the like of a part of or the entire cut end surface can be improved as compared to a conventional cutting method.

In a case of a coated or laminated multi-layered material, by forming its cut end surface into the same shape as the cut end surface of the multi-layered material according to the present embodiment, it is possible, on the cut end surface, not only to improve corrosion resistance of its base material, but also to prevent a bulge under the coating or film, to improve its appearance by preventing the base material from being exposed, and to improve insulation properties of a part of or the entire cut end surface.

As seen from the above, by forming a shape of a cut end surface of a multi-layered material into the shape of the cut end surface according to the present embodiment, the effect provided by a coating material on its upper and lower surfaces can be also exerted on the cut end surface of the multi-layered material. Note that the effect provided by the coating material is not limited only to the example described above and can be exerted in accordance with an application.

REFERENCE SIGNS LIST

5,S plated steel sheet (multi-layered material)
5*a* base material
5*b* plating layer (coating material)
5*c* burr
5*s* cut end surface
10 pay-off reel
11 first slitting blade
11*a* blade portion (first slitting blade)
12 second slitting blade
12*a* blade portion (second slitting blade)
20 tension generating device
30 tension reel
71,710 punch
72,720 die
73,730 blank holder
100 slitting apparatus
110 first slitting blade
110*a* blade portion (first slitting blade)
120 second slitting blade
120*a* blade portion (second slitting blade)
200 punch
300 shear
P1 inclined portion
P2 protruding portion
Q overlapping portion
s1 tool inclined surface
s2 vertical wall surface
s3 pressing surface
c corner portion

The invention claimed is:

1. A cutting apparatus for cutting a multi-layered material sandwiched between a first rotary tool and a second rotary tool, wherein
the first rotary tool and the second rotary tool are configured to cut the multi-layered material,
the first rotary tool and the second rotary tool are disposed such that blade portions of the first rotary tool and blade portions of the second rotary tool face each other in a pressing direction,
the blade portions of the first rotary tool includes:
an inclined portion including a tool inclined surface that is inclined with respect to the pressing direction; and
a protruding portion including a vertical wall surface and a pressing surface and protruding from the inclined portion in the pressing direction, the vertical wall surface extending from the tool inclined surface along the pressing direction, the pressing surface being perpendicular to the vertical wall surface,
the blade portions of the second rotary tool includes a second flat vertical wall surface extending along the pressing direction and a second pressing surface perpendicular to the second flat vertical wall surface, the second flat vertical wall surface faces the vertical wall surface of the protruding portion in a direction perpendicular to the pressing direction, and
the inclined portion overlaps the second vertical wall surface of the second rotary tool that faces the inclined portion as viewed in the pressing direction.

2. The cutting apparatus according to claim 1, wherein an inclination angle of the tool inclined surface with respect to the pressing direction is 15° to 45°.

3. The cutting apparatus according to claim 1, wherein a length of the vertical wall surface in the pressing direction is 0.1 mm to 0.8 mm.

4. The cutting apparatus according to claim 1, wherein the first rotary tool and the second rotary tool each include the inclined portion and the protruding portion.

5. The cutting apparatus according to claim 1, wherein a curvature radius of a corner portion at which the vertical wall surface and the pressing surface intersect with each other is 0.1 mm or less.

6. The cutting apparatus according to claim 1, wherein a shape of the first rotary tool and a shape of the second rotary tool are symmetrical to each other.

7. The cutting apparatus according to claim 2, wherein a length of the vertical wall surface in the pressing direction is 0.1 mm to 0.8 mm.

8. A method for cutting the multi-layered material comprising:

cutting the multi-layered material using the cutting apparatus according to claim 1.

* * * * *